US 7,051,096 B1

United States Patent
Krawiec et al.

(10) Patent No.: US 7,051,096 B1
(45) Date of Patent: *May 23, 2006

(54) SYSTEM AND METHOD FOR PROVIDING GLOBAL SELF-SERVICE FINANCIAL TRANSACTION TERMINALS WITH WORLDWIDE WEB CONTENT, CENTRALIZED MANAGEMENT, AND LOCAL AND REMOTE ADMINISTRATION

(75) Inventors: Theodore J. Krawiec, Malibu, CA (US); Stephen M. Gryte, Los Angeles, CA (US); John Frederick Riblett, Culver City, CA (US); Chris Shu-Wing Yu, Hacienda Heights, CA (US)

(73) Assignee: Citicorp Development Center, Inc., Los Angeles, CA (US)

(*) Notice: Subject to any disclaimer, the term of this patent is extended or adjusted under 35 U.S.C. 154(b) by 581 days.

This patent is subject to a terminal disclaimer.

(21) Appl. No.: 09/653,633

(22) Filed: Sep. 1, 2000

Related U.S. Application Data

(60) Provisional application No. 60/152,183, filed on Sep. 2, 1999.

(51) Int. Cl.
 *G06F 15/173* (2006.01)
 *G06F 17/60* (2006.01)
(52) U.S. Cl. .................................. 709/223; 235/379

(58) Field of Classification Search ........ 709/223–226; 382/114; 345/173–178; 235/379; 381/56–59, 381/71.1–71.4, 72, 73.1, 74
See application file for complete search history.

(56) References Cited

U.S. PATENT DOCUMENTS 4,438,326 A 3/1984 Uchida ................. 235/379

(Continued)

OTHER PUBLICATIONS

"Web Application Servers Give Green Light to ERP—Integration Tools Give ERP a Role in E-Commerce" by Martin Marshall, *Informationweek, 1999*, Apr. 5, 1999.

(Continued)

*Primary Examiner*—David Wiley
*Assistant Examiner*—Arrienne M Lezak
(74) *Attorney, Agent, or Firm*—George T. Marcou; Kilpatrick Stockton LLP

(57) ABSTRACT

A method and system for providing global self-service transaction terminals or automatic teller machines (ATMs) affords worldwide web content to ATM customers, centralized management for ATM operators, and supports local and remote administration for ATM field service personnel. The system includes multiple ATMs coupled over a network to a host, and the ATMs are provided with a touch screen interface and an interface for visually impaired persons. The ATMs enable both local and remote administration of ATM operations by bank personnel and an integrated network control. The ATMs are web-enabled, and ATM communications are performed over a communications network.

36 Claims, 27 Drawing Sheets

U.S. PATENT DOCUMENTS

| | | | |
|---|---|---|---|
| 4,625,276 A | | 11/1986 | Benton et al. ............... 364/408 |
| 5,253,167 A | | 10/1993 | Yoshida et al. ............. 364/408 |
| 5,589,855 A | * | 12/1996 | Blumstein et al. .......... 345/173 |
| 5,610,382 A | | 3/1997 | Yamamoto |
| 5,616,901 A | * | 4/1997 | Crandall ..................... 235/379 |
| 5,850,442 A | * | 12/1998 | Muftic ........................ 705/65 |
| 5,933,816 A | * | 8/1999 | Zeanah et al. ................ 705/35 |
| 6,014,649 A | | 1/2000 | Kobayashi et al. ........... 705/43 |
| 6,023,688 A | | 2/2000 | Ramachandran et al. ..... 705/44 |
| 6,115,482 A | * | 9/2000 | Sears et al. ................. 382/114 |

OTHER PUBLICATIONS

"HTTP, Java Provide Run-Time Control" by Steven Houtchens, *Electronic Engineering Times*, Nov. 4, 1996.

Reaching a Market of 43 Million (Marketing for People with Disabilities) by James Smart, *Bank Marketing*, Mar., 1993.

"Windows: The Platform for Retail Delivery", *Banks Systems & Technology*, p. 47, May, 1994.

\* cited by examiner

| | |
|---|---|
| 16 | Process Control: System Startup and Shutdown |
| 18 | System Monitor |
| 20 | VIP Headphones |
| 22 | VIP Screen Reader |
| 24 | Operator Interface |
| 26 | ATM Session Manager (ASM) |
| 28 | Devices |
| 30 | System Management |
| 32 | Diagnostics |
| 34 | Intelligent Maintenance Panel (IMP) |
| 36 | Logging |
| 38 | Installation and Fallback |
| 40 | Configuration |

FIG. 2

| | |
|---|---|
| 42 | Starting and Monitoring Platform Processes and Services |
| 44 | Restarting Processes or Rebooting the System |
| 46 | Coordinating an Orderly Shutdown in Most Cases |
| 48 | Maintaining a Registry of Processes Started |
| 50 | Root of Most System Management Commands |

FIG. 3

| Operation | Who Initiates | Actions |
|---|---|---|
| Local Shutdown | IMP | Stop Cat (C), Shutdown (B), reboot (optional (C) |
| Stop Cat | INC, OI | Prevent new customer session (B), time out current session (C), kill LDM, TAFE, GI (C) |
| Stop Immediate | INC, OI | Kill LDM, TAFE, GI (C), Stop all sessions (B) |
| Stop and Isolate | INC | Shutdown (N) |
| Start Cat | INC, OI | Start LDM, TAFE, GI (C), Allow customer session (B) |
| Reboot | INC, OI | Stop Cat (C), Reboot (B) |

Legend: (C) NT CAT only  (N) NTDS only  (B) both CAT Operations

FIG. 5

| | |
|---|---|
| 56 | Blanking and Unblanking a Front Screen Display During System Shutdown and Startup |
| 58 | Resetting a Hardware Watchdog Timer Periodically |
| 60 | Resetting the Hardware Watchdog Timeout Value for System Operation and Reboot |
| 62 | Sending Notification to INC when the System has been Reset due to the Watchdog Timer |

FIG. 6

| | |
|---|---|
| 64 | VIP application starts either by detection of headphone insertion or by double tap |
| 66 | Software control of audio amplifier output for routing to either speaker or headphone |
| 68 | Audio amplifier board with software control |
| 70 | Diagnostics for testing functionality of amplifier board |

FIG. 7

72 — Text-to-speech capability

74 — Screen layout and navigational method that allows sequence through screens and selections using only the touchscreen

FIG. 9

Selecting a Choice

| | |
|---|---|
| 90 | Orderly shut down or reboot system |
| 92 | Start ATM |
| 94 | Stop ATM |
| 96 | Stop ATM immediate |
| 98 | View status of ATM (device up/down, host up/down, ATM up/down) |
| 100 | View activity/MIS log (peruse) |
| 102 | View NT event logs (log viewer) |
| 104 | View software release information |
| 106 | Configure ATM (auto and manual configuration) |
| 108 | View ATM configuration |
| 110 | View TTM status |
| 112 | Load keys (P75) |
| 114 | Start back admin |
| 116 | Start diagnostics (P75) |
| 118 | Start command shell |
| 120 | User account administration |

FIG. 14

| | |
|---|---|
| 122 | Bring up browser in full-screen mode |
| 124 | Coordinate starting and re-starting of customer sessions |
| 126 | Coordinate starting of an operator session at the front screen |
| 128 | Coordinate entering into and exiting out of hardware diagnostics initiated from the intelligent maintenance panel (IMP) |
| 130 | Support "Start/Stop/Stop immediate CAT" functions |
| 132 | Display the out-of-service screen under various scenarios |
| 134 | Recover from out-of-service by monitoring status of host connection, and status of devices and switches which impact usability of the ATM by customers |
| 136 | Report various ATM status information when the system management agent or operator interface inquires the component |
| 138 | Report when the ATM is out of service, and when it is back in service after having been out of service |
| 140 | Report the state of the ATM to indicate whether it is in use or idle, diagnostics is running, or back administration utility is running |

FIG. 16

| Responsibilities | Collaborators |
|---|---|
| Bring up browser | Browser |
| Blank and un-blank front screen | Video blanking kernel driver |
| Start and restart customer session | Web Browser, customer session ASP script, Session Controller |
| Start operator session at front screen | Web Browser, operator session ASP script, Session Controller |
| Enter and exit diagnostics | Operator Panel Controller, Device Manager |
| Start/stop/stop immediate CAT | Device Manager, Process Controller |
| Display out-of-service screen | Browser |
| Receive session status changes | Welcome Mat, Operator Interface |
| Recover from out of service | Device Manager, Back Door Manager |
| Request device status | Device Manager |
| Receive host status instrument events | Back Door Manager |
| Respond to inquiry about ATM status | Command Dispatch Agent, Operator Interface |
| Receive OI dialogs status changes | Back Admin Dialog, Diagnostics Dialog |
| Report different states of ATM | Event Notifier |

FIG. 17

| 154 | Status Monitoring |
|---|---|
| 156 | Inquiry and Control Commands |
| 158 | File Transfer and Remote Command Execution |
| 160 | Software Distribution |
| 162 | Remote Peruse |
| 164 | Log Upload |
| 166 | Auto Configuration |
| 168 | DNS Load Balancing Support |
| 170 | Device MIS |
| 172 | Customer MIS |
| 174 | Time Synchronization |

FIG. 19

| Device | Description |
|---|---|
| CAT | Entire CAT |
| CRT/TSC/STS | Touch Screen |
| RDR | Dip/Dynamic Reader |
| PTR/PRT | Printer |
| CDM | Cash Dispenser |
| DEP | Depositor |
| TRD | Transfer Card Reader |
| SAF | Cash Safe |
| FLS | CPE Flash Memory |
| SW | Switch |
| KMM | Eurocheck NM |
| CS | Citishield |
| SCM | Belgium SCM |
| PIN | PIN PAD* |

FIG. 20

| | |
|---|---|
| 176 | Executes diagnostics requests on behalf of a diagnostic client, such as the IMP controller using OLE automation |
| 178 | Communicates directly with the physical device handlers (PDH) for all devices |
| 180 | Activates PDHs at the beginning of a diagnostics session (Start Diag) |
| 182 | Uses the PDH message interface to command and/or control devices |
| 184 | Deactivates PDHs at the end of diagnostics session (End Diag) |
| 186 | Performs various diagnostics tests on certain peripheral devices |
| 188 | Can determine and provide the specific device list to a client |

FIG. 21

| | |
|---|---|
| INIT | Device Manager "device initialization" |
| OOS | Out of Service condition |
| IDLE | At "Hello screen" (ready for customer session) |
| BUSY | Customer session in progress |
| ADMN | Back Admin (proofing) in progress (within OI session) |
| DIAG | Diagnostics Session in progress (note: this mode display is not real useful for the pilot due to only rear diagnostics being supported in FLTLL IMP screen mode) |
| OPEN | Safe door is open (this status is obtained from DM) |
| TEST | CDM Tests (or Self Tests) in progress NOT in the Pilot phase |
| DOWN | The result of doing a STOP CAT |
| OI | OI Session in progress (NEW Session State for VIP GCAT) |

FIG. 23

SYSTEM AND METHOD FOR PROVIDING GLOBAL SELF-SERVICE FINANCIAL TRANSACTION TERMINALS WITH WORLDWIDE WEB CONTENT, CENTRALIZED MANAGEMENT, AND LOCAL AND REMOTE ADMINISTRATION

PRIORITY APPLICATION

This application claims the benefit of U.S. Provisional Application No. 60/152,183 filed Sep. 2, 1999, incorporated herein by this reference.

CROSS REFERENCE TO RELATED APPLICATIONS

This application is related to U.S. Provisional Application No. 60/162,816 filed Nov. 1, 1999, incorporated herein by this reference.

FIELD OF THE INVENTION

The present invention relates generally to the field of self-service financial transaction terminals, such as automatic teller machines (ATMs), and more particularly to a system and method for providing global self-service financial transaction terminals (ATMs) with worldwide web content to self-service ATM customers, including access for visually impaired customers, centralized management for ATM operators, and local and remote administration for ATM field service personnel.

BACKGROUND OF THE INVENTION

Currently, ATM machines have limited support for display of web content, for remote management of the ATM, for remote software distribution, and for diagnostic troubleshooting. ATM machines include computer applications or software running on computer hardware within the ATM machine which, for example, interfaces with a host computer and other remote computers connected to the ATM machine over a network. On ATM systems that a financial institution, such as a bank, develops and that are used in branches or other locations, there are a set of functions that are used by supervisors and operators in the branch. These operator and supervisor functions are outside of the customer applications and need to be performed on a routine basis to maintain the service to administer those ATM machines.

The ATM is essentially a machine that has a computer within it that runs an operating system, such as Windows NT, and other software components that are running within the infrastructure software that supports global ATM applications. Different types of activities occur at the ATM, one of the most critical of which is customer transaction session type activity. At different times, there are other types of activities that go on at the ATM, such as administration of the ATM when it is necessary to perform a settlement between the ATM and the host for the transactions that have occurred since the last time a settlement was performed.

Also, between the ATM and system management, there are activities to control the ATM by the system management, such as stopping or rebooting the ATM remotely. There are other kinds of ATM maintenance types of activity which have to be supported from time to time when there is a hardware problem, and there are other kinds of hardware or device related activity, for example, in which a field service engineer must go to a particular ATM for a diagnostics type of session. It is inevitable that a collision can occur between these activities in terms of contention for resources or that could affect the integrity, for example, of a customer transaction while it is progress, in the absence of some kind of coordination of such activities.

Typically, a financial institution, such as a bank, develops its own proprietary ATM hardware and software, in addition to ATM hardware and software which it may purchase from a variety of ATM vendors. Implementation of systems from other makers can be difficult because, for example, of difficulty in interfacing and reusing present application resources. ATMs contain special devices, such as cash dispensers, card readers, and printers, which require a specialized interface for control from applications. Previously, hardware makers' interfaces were proprietary, and the Windows Open Services Architecture Extensions for Financial Services (WOSA/XFS) were developed to define a standard for application control of specialized ATM peripherals.

ATM machines include computer applications or software running on computer hardware within the ATM machine which, for example, displays on the ATM touch screen and interfaces with a host computer and other remote computers connected to the ATM over a network. Before an ATM machine is deployed, the software must be installed on the processor or computer hardware of the ATM machine, and from time to time, it may be necessary to upgrade the software on the ATM machine.

Currently, when an ATM machine is to be deployed, for example, by a financial institution, such as a bank, it is necessary for the financial institution to send a technical representative to perform a local installation of the software on the ATM machine. It may likewise be necessary for the financial institution to send a technical representative to perform a local upgrade of the software on the ATM machine from time to time. ATM machines are typically located, for example, at local branches of the financial institution, which may require the technical representative to travel a considerable distance. Thus, there is a substantial cost to the financial institution in terms, for example, of the time and travel expense associated with locally installing and/or upgrading software releases on the ATM machines.

The financial institution, such as the bank, which has a global ATM product, requires software that runs on the ATMs that is designed to run in a global environment throughout the world and across many different hardware vendors. In that situation, the financial institution also wants to have one common release of the software for the product. However, in order to have a common software release for each particular financial terminal on which the product is loaded, each financial terminal must be tailored with specific information that is peculiar to it, and putting that site specific information on the terminal is problematic.

Presently, use of an ATM by a customer of the financial institution, such as the bank, presents a tremendous challenge to the customer who happens to be partially sighted and a virtually impossible task for the customer who happens to be totally non-sighted. Typically, when a customer goes to an ATM to perform a financial transaction, such as deposit, withdraw, or transfer funds, the customer communicates with the bank's ATM system via a touch screen and perhaps a keypad at the ATM. Currently, many ATMs which are intended to support visually impaired people do not have an audio circuit. Such ATMs use touch screens, and the access for a visually impaired person is to approach the ATM and touch the touch screen to begin an ATM session and to enter his or her personal identification number. While some of these ATMs use different fonts on the touch screen, for example, for partially sighted persons, such ATMs are of no benefit to totally non-sighted persons.

In some currently available ATM's for visually impaired persons, the navigation is in a large area of the screen, such as quadrants or quarters of the screen, on the principle that even a totally unsighted person should be able to fairly accurately touch a quarter of the screen without being any more precise than that in order to make a selection. For example, if the visually impaired person is entering information, such as a number in order to withdraw money, the visually impaired person enters a number by touching the touch screen a certain number of times, such as two times for the number two or three times for the number three. A limited number of ATMs intended to support visually impaired persons currently provide audio feedback, such as a scripted audio functionality via a built-in loudspeaker to supplement the touchscreen/keypad interface for visually impaired persons. However, such ATMs have not provided a particularly satisfactory solution for visually impaired persons, for example, because the scripted prompts are audible to passers-by, which compromises both the privacy and the security of the visually impaired person's ATM transaction.

SUMMARY OF THE INVENTION

It is a feature and advantage of the present invention to provide a method and system of centralized system management of ATMs, local and remote administration of the ATMs for operators and field service personnel, and for delivering world wide web content to ATM customers.

It is a further feature and advantage of the present invention to provide a method and system of centralized system management and local and remote administration of ATMs which are web-enabled.

It is another further feature and advantage of the present invention to provide a method and system of centralized system management and local and remote administration of ATMs in which ATM communications are performed over a communications network.

It is a further feature and advantage of the present invention to provide a system and method for use of an ATM by both partially sighted and non-sighted visually impaired persons.

It is another feature and advantage of the present invention to provide a system and method for use of an ATM by a visually impaired person which incorporates screen reader technology to read text presented on the touch screen and convert the text to audio form for a visually impaired person.

It is still another feature and advantage of the present invention to provide a system and method for use of an ATM by a visually impaired person which diverts audio to a headphone jack to enable the visually impaired person to hear the converted screen information in privacy.

It is an additional feature and advantage of the present invention to provide a system and method for use of an ATM by a visually impaired person which utilizes a standard format and screen reader software to enable the unsighted person to easily navigate through an ATM session.

To achieve the stated and other features, advantages and objects, an embodiment of the present invention provides a method and system for providing global self-service transaction terminals (ATMs) that affords worldwide web content to self-service ATM customers, centralized management for ATM operators, and supports local and remote administration for ATM field service personnel. The system includes multiple self-service ATMs coupled over a network to a host, and the ATM terminals are provided with a touch screen interface and an interface for visually impaired persons. The terminals enable both local and remote administration of terminal operations by bank personnel.

The terminals for an embodiment of the present invention are web-enabled, and terminal communications are performed over a communications network. The operations software for the global ATM for an embodiment of the present invention is built on self-service architecture, referred to herein as NTDS, in cooperation with Windows Open Systems Architecture/Extensions for Financial Services (WOSA/XFS) software.

In an operational aspect of an embodiment of the present invention, a startup request is received by a process controller of a transaction terminal to start one or more transaction terminal processes, such as a system monitor, an audio application for visually impaired customers, a screen reader application for visually impaired customers, a session manager, a device manager, a system manager, a diagnostics application, an intelligent maintenance panel, a log manager, an installation framework, and/or a configuration framework. The process controller starts the requested process, and the process that is started up performs one or more pre-defined transaction terminal functions. If a shutdown command is received, the process controller also coordinates an orderly shutdown of the transaction terminal.

The startup request can be received by the process controller from either an integrated network control over a network (to which a number of other transaction terminals are also coupled) or an operator interface touchpoint, such as a front screen of the transaction terminal, a personal computer on a network, a video screen, or a personal data assistant. In addition to starting one or more processes, for each started process, the process controller also monitors the process, restarts the process if necessary, reboots the transaction terminal system if necessary, and maintains a registry of the started process.

If the process that is started up is the system monitor, the system monitor performs one of more system monitor functions, including blanking a screen display, unblanking the screen display, resetting a hardware watchdog timer, resetting a hardware watchdog timeout value, or sending a system reset notification to an integrated network control. If the started up process is the audio application, the audio application performs one or more audio application functions consisting of controlling routing of an audio amplifier output or controlling an audio amplifier board, diagnostic testing of the amplifier board. If the process that the process controller starts up is the screen reader application, the screen reader application performs one or more screen reader functions, including converting text-to-speech or providing a screen layout with navigation selections exclusively by touchscreen.

If the process controller starts up the session manager, the session manager can perform one or more session manager functions consisting of bringing up a browser, coordinating a customer session, an operator session, and/or a hardware diagnostics session, supporting a transaction terminal start function and/or a transaction terminal stop function, displaying an out-of-service transaction terminal screen, recovering from an out-of-service condition of the transaction terminal, reporting pre-selected transaction terminal status information, reporting one of an out-of-service and a back-in-service condition of the transaction terminal, and/or reporting a state of the transaction terminal as one of in use, idle, diagnostics running, and back administration utility running.

If the process started by the process controller is the device manager, the device manager may perform one or more device manager functions, including coordinating and allocating a cash dispensing module, a depositor, a dynamic reader, a touchscreen, a printer, a switch, and/or an indicator. If the process controller starts up the system manager, the system manager can perform one or more system manager functions consisting of transaction terminal status monitoring, inquiry and control commands, file transfer and remote command execution, software distribution, remote peruse, log upload, auto configuration, load balancing support, device MIS, customer MIS, or time synchronization.

If the process controller starts up the diagnostics application, the diagnostics application may perform one or more diagnostics application functions including diagnostics requests, communicating with a physical device handler, diagnostic testing of a peripheral device, or providing a list of devices to a client. If the process started by the process controller is the intelligent maintenance panel, the intelligent maintenance panel may perform one of more intelligent maintenance panel functions including obtaining status of one of a session and a device, performing a shutdown and/or a reboot through an operator request, performing an operator interface log on via an operator selection, allowing a service mode entry, or requesting a diagnostic test.

If the process started up by the process controller is the log manager, the log manager can perform one or more log manager functions consisting of maintaining a business log or maintaining a runtime log. If the started up process is the installation framework, the installation framework may perform one or more installation framework functions consisting of distribution of software release packages, activation of software release packages, cutover of software release packages, fallback to a previously running version of software, backing out of a last distributed software release package or reinstalling a previous software versions. If the process started by the process controller is the configuration framework, the configuration framework may perform one or more configuration framework functions including installing and configuring software or configuring the transaction terminal.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 2 is a table which shows examples of significant components of the global ATM architecture for an embodiment of the present invention;

FIG. 3 is a table which shows examples of the major functionality of process control for an embodiment of the present invention;

FIG. 5 is a table which shows examples of operator commands that include Start Cat and Stop Cat for an embodiment of the present invention;

FIG. 6 is a table with shows examples of the major functionality of the system monitor for an embodiment of the present invention;

FIG. 7 is a table which shows examples of the major functionality of VIP headphones for an embodiment of the present invention;

FIG. 9 is a table which shows examples of the major functionality of VIP screen reader for an embodiment of the present invention;

FIG. 14 is a table which shows examples of major operator functionalities of the operator interface (OI) for an embodiment of the present invention;

FIG. 16 is a table which shows examples of significant functionality of the ASM for an embodiment of the present invention;

FIG. 17 is a table which summarizes examples of the relationships between the ASM and its collaborators for an embodiment of the present invention;

FIG. 19 is a table which illustrates examples of the major functionality of system management for an embodiment of the present invention;

FIG. 20 is a table which illustrates examples of devices on the ATM for which INC is configured to support for an embodiment of the present invention;

FIG. 21 is a table which shows examples of significant functionality of diagnostics for an embodiment of the present invention;

FIG. 23 is a table which shows examples of session states for an embodiment of the present invention;

DETAILED DESCRIPTION

Figure 1:
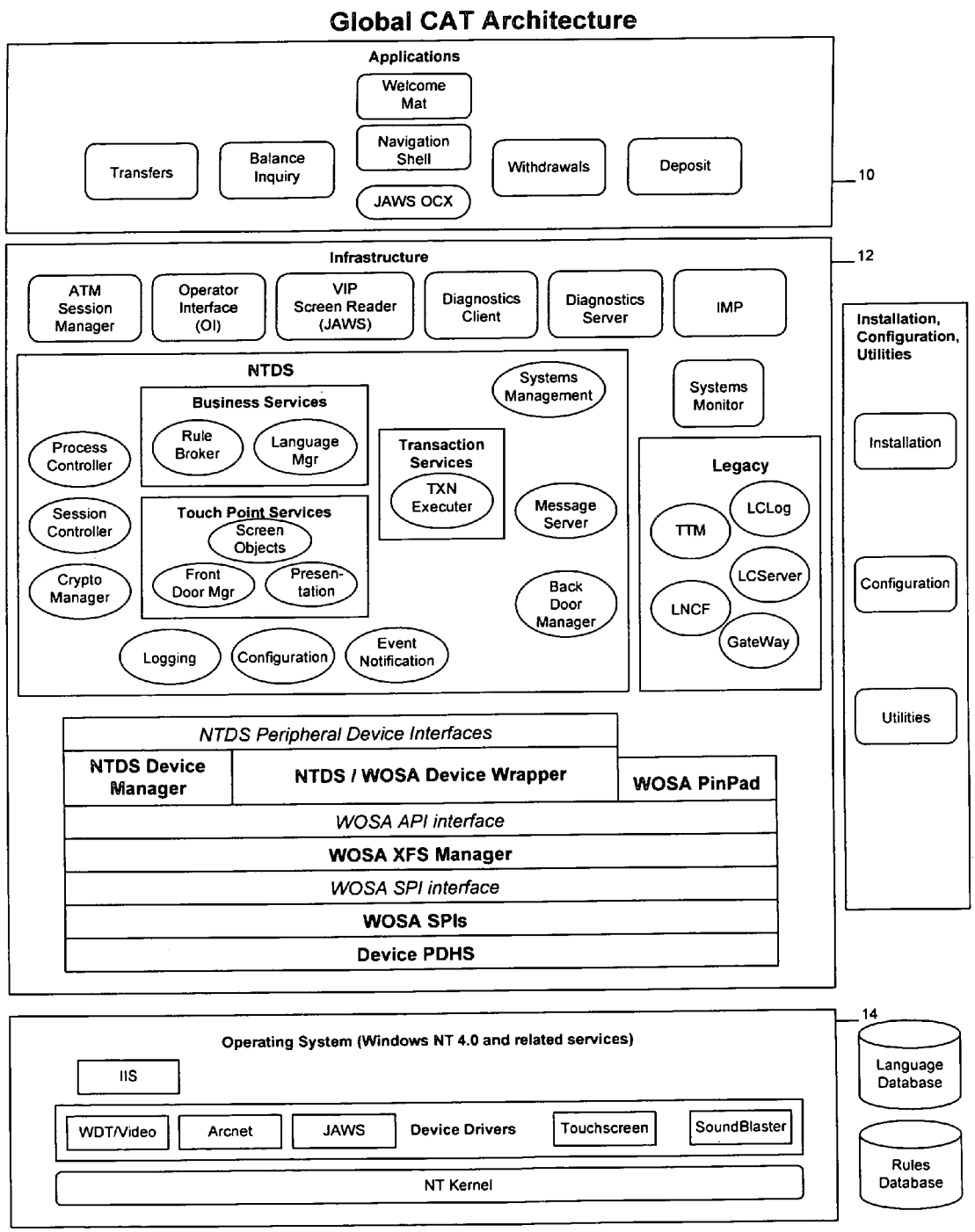
FIG. 1 is a schematic diagram with illustrates a high level overview of the software architecture of the Global CAT for an embodiment of the present invention.

Referring now in detail to an embodiment of the present invention, one or more examples of which are illustrated in the accompanying drawings, an embodiment of the present invention provides a method and system for providing global self-service transaction terminals or automatic teller machines (ATMS) that affords worldwide web content to ATM customers, centralized management for ATM operators, and supports local and remote administration for ATM field service personnel. The system includes multiple ATMs coupled over a network to a host, and the ATMs are provided with a touch screen interface and an interface for visually impaired persons. The ATMs enable both local and remote administration of ATM operations by bank personnel. The ATMs are web-enabled, and ATM communications are performed over a communications network.

"CAT" is an acronym used by a particular financial institution for its ATMs, which are known as customer activated terminals. The CAT is the latest generation of an ATM for the particular financial institution worldwide. "CAT" is also an acronym for the set of software that runs on ATMs operated by the particular financial institution. "Global CAT" is a collection of software that can reside on a CAT or any other brand of ATM which is to be deployed worldwide. In the worldwide deployment of ATMs, each region supports its own languages and business rules, so the Global CAT supports multiple languages and country-specific business rules.

In an embodiment of the present invention, the Global CAT allows a customer to perform certain banking transactions, such as transfers of money between accounts, a balance inquiry to find out the balance on individual accounts, cash withdrawals to get money out of the machine, and deposits by placing either checks or cash into envelopes and putting them into the machine via a depositor, which is a component piece of equipment on the CAT. In order to use the Global CAT, the customer approaches the CAT with a transaction card issued by the bank and dips or swipes the card into a card reader of the CAT. The card reader reads the card and recognizes the customer. Software on the processor of the CAT executes certain code, which is sent out over a network to a host computer that contains the account information of the person, and the host verifies the customer's personal identification number (PIN).

In an embodiment of the present invention, when the customer dips or swipes his or her card, a "Hello" or "Welcome" screen is displayed on a video monitor by the Global CAT, and he or she enters the PIN in response to prompts on the screen. That information is sent off as a message to the host for verification that it is indeed the PIN of the person who has dipped the card, and the host retrieves a certain account information for the person. At that point, certain screens are presented to the customer on the video monitor of the CAT for the customer to navigate through different choices. The interface for the customer at the Global CAT is known as a touch screen, and the customer interfaces with the Global CAT by touching an area on the video monitor of the Global CAT. The customer's touch is read and then translated into a choice displayed on the screen. The choices displayed on the screen include choices, such as "Do you want to do transfer?", "Balance inquiry", "Withdrawal", or "Deposit".

In an embodiment of the present invention, the customer who wishes to make a withdrawal presses an area on the screen that is a rectangle with the word "Withdrawal" on it. That leads to another screen displayed on the video monitor asking, for example, "From what account?", and thereafter, "What amount?". Thus, the customer continues to read the screens and touch different areas on the video monitor to accomplish what the customer wants to do. For example, if the customer wishes to withdraw cash, cash is dispensed out of a mechanism of the CAT called a cash dispensing mechanism. Following a withdrawal, the customer removes the cash and ends the CAT session by indicating to the CAT that the customer is finished by exiting. Another choice which can be offered to the customer at the Global CAT, for example, is to make a purchase at the Global CAT, such as purchasing airline tickets or stamps. The customer uses the same mechanism of dipping his or her card and entering his or her PIN. The customer's identification is authenticated via the host, and the customer is then presented a set of screens that allows the customer to navigate for such functionality.

In a visually impaired person (VIP) aspect of the Global CAT for an embodiment of the present invention, the Global CAT supports both sighted people and non-sighted people. The VIP Global CAT has special provisions to support visually impaired persons in a totally non-sighted category, as well as a partially sighted category. The VIP Global CAT is conveniently located in various places for use by a visually impaired customer, such as in bank branches, grocery stores, or department stores. A larger font on the touch screen to make it easier for partially sighted persons to see. In addition, the VIP Global CAT makes use of screen reader technology that reads text presented on the touch screen and converts the text to audio form for the visually impaired person. Further, special hardware and software in the VIP Global CAT diverts the audio to a headphone jack for visually impaired customers. Also, the VIP Global CAT includes a standard touch screen format that allows visually impaired customers to easily navigate through a session at the CAT and receive audio instruction feedback through the headphone jack.

The VIP Global CAT for an embodiment of the present invention includes, for example, specific functionality within the VIP Global CAT to accommodate both partially sighted and non-sighted persons. For partially sighted persons, the VIP Global CAT makes provisions, such as use of large fonts, and certain aspects of the screen are larger than they are for sighted persons to make it easier for partially sighted persons to see. The VIP Global CAT also incorporates the screen reader technology, such that when the text that a fully sighted person sees is presented on the screen, the screen reader software reads the text and converts the text to audio form for the visually impaired person. The VIP Global CAT makes use of special hardware and software to allow the audio to be diverted to a headphone jack.

Thus, a non-sighted customer approaches the VIP Global CAT for an embodiment of the present invention in a similar way as a sighted customer, except the non-sighted customer is provided with a headphone. The non-sighted customer inserts a headphone jack into a socket for the headphone, and all of the screen information is translated into audio for the non-sighted customer. Thus, the non-sighted customer is able to hear the translated screen information through the headphone, along with instructions that are given to the non-sighted customer on how to navigate. It is an important aspect of the VIP Global CAT to eliminate the audio sound that is audible for anyone nearby to eavesdrop on the visually impaired customer's session at the CAT and thus to provide a more secure system for visually impaired customers.

In an embodiment of the present invention, a non-sighted person enters information at the VIP Global CAT in a way that is similar to the way in which a sighted person enters information, in the sense that the interface is with the touch screen that covers the surface area of the monitor. Both sighted and non-sighted persons enter information by touching the screen in certain zones. However, the zones on the touch screen are laid out somewhat differently for a non-sighted person than for a sighted person. A standard format is used to allow the non-sighted person to navigate to a next screen or previous screen or to exit. Each time the non-sighted person makes a selection, the screen reader software gives the non-sighted person audio instructions. Thus, the non-sighted person is able to navigate through a session at the VIP Global CAT by touching the touch screen and receiving feedback through the audio instructions.

The Global CAT for an embodiment of the present invention has, for example, two different clients, one of which is the bank customer and the other of which is the bank's personnel. The bank's personnel must perform certain operations on the Global CAT, referred to as back administration, such as proofing or verifying and balancing the cash in the CAT against what the CAT processor believes should be in the machine and cash replenishment as the CAT dispenses cash from time to time. Another operation performed by the bank's personnel is a diagnostic function. If there is a malfunction at the Global CAT, software on the Global CAT can be executed by the bank's personnel to diagnose the hardware and let them know whether there is a problem, for example, with the cash dispensing mechanism, the depositor mechanism, or any of the other hardware on the machine.

Another operation that is performed in connection with the Global CAT for an embodiment of the present invention is called remote administration. The Global CAT is part of a network of CATs within a region for which there is a single point of administration performed remotely by a machine referred to as an integrated network control (INC). The INC can communicate with hundreds or thousands of the Global CATs and includes features, such as log retrieval for auditing purposes. In addition each Global CAT stores transactional information, and periodically, the INC uploads these files and performs a reconciliation. Further, software is distributed from the central point of the INC and downloaded at the Global CATs from time to time to upgrade the software or to add new functionality in the CAT software.

The Global CAT software for an embodiment of the present invention is built around the software referred to as NTDS, also known as self-service architecture. The NTDS software provides the basic infrastructure for the internal Global CAT software, such as process and session control, logging, and the software functionality that is needed, for example, to communicate with devices to display the screens and to operate the cash dispensing mechanism as well as the other hardware of the Global CAT. The inside software which runs on the Global CAT processor also makes use of Windows Open Systems Architecture/Extensions for Financial Services software (WOSA/XFS), which is a standard or model that is used to control ATM devices, to control specific financial devices, such as cash dispensing mechanisms of the Global CAT. The Global CAT makes use of additional software, such as a device manager, which is a component of the Global CAT architecture that is used to coordinate and allocate the Global CAT devices. Another feature of the inside software for the Global CAT is referred to as the WOSA/XFS device wrapper, which is used to interface the NTDS system with the WOSA/XFS system.

The Global CAT architecture for an embodiment of the present invention includes local administration, which relates to operator interface and makes use of software running on the Global CAT processor into which the bank's personnel can log, using identification and authentication, such as a password and a name, to perform different types of operations. These operations include, for example, the back administration, such as replenishment of cash. The Global CAT architecture also includes remote administration, which makes use of software running on the Global CAT processor for what is referred to as systems management that communicates with an external aspect of the system which is the INC. The Global CAT architecture also includes software installation and configuration, which relates to software that is used to install the software and then to configure both the software and the hardware to run the Global CAT. Other components of the Global CAT architecture include, for example, diagnostics and an ATM session manager that is used to coordinate the sessions, for example, for a customer as screens are presented to the bank customer. For example, the ATM session manager actually coordinates the presentation by the operator interface of a set of screens interfacing to the bank's personnel.

The software architecture for the Global CAT for an embodiment of the present invention includes a number of software components which can be presented in a layered approach for a top down understanding of the architecture, including an overall view of all of the software components at a high level and a reduction on a major functionality basis. FIG. 1 is a schematic diagram with illustrates a high level overview of the software architecture of the Global CAT for an embodiment of the present invention. Referring to FIG. 1, the typical three-layered approach includes, for example, applications 10, infrastructure 12, and operating system 14, each of which contains high level functionality for that particular layer.

Operations software for the global ATMs for an embodiment of the present invention is built on self-service architecture referred to herein as NTDS in cooperation with Windows Open Systems Architecture/Extensions for Financial Services (WOSA/XFS) software. FIG. 2 is a table which shows examples of significant components of the global ATM architecture for an embodiment of the present invention. Referring to FIG. 2, these components include, for example, process control 16, system monitor 18, visually impaired person (VIP) headphones 20, VIP screen reader 22, operator interface 24, ATM session manager 26, devices 28, system management 30, diagnostics 32, intelligent maintenance panel 34, logging 36, installation and fallback 38, and configuration 40.

FIG. 3 is a table which shows examples of the major functionality of process control 16 for an embodiment of the present invention. Referring to FIG. 3, significant functionality of process control 16 includes, for example, starting and monitoring platform processes and services 42, restarting processes or rebooting the system 44, coordinating an orderly shutdown 46 in most cases, maintaining a registry of processes started 48, and serving as the root of most system management commands 50. Startup can be automatic via NT service control or manual via NTDS operator utility. The Global CAT is started via "net start" in a startup.bat file. Shutdown occurs on systems management shutdown or reboot commands. Shutdown can be manual via NTDS operator utility or via an NT "net stop" command.

Figure 4:
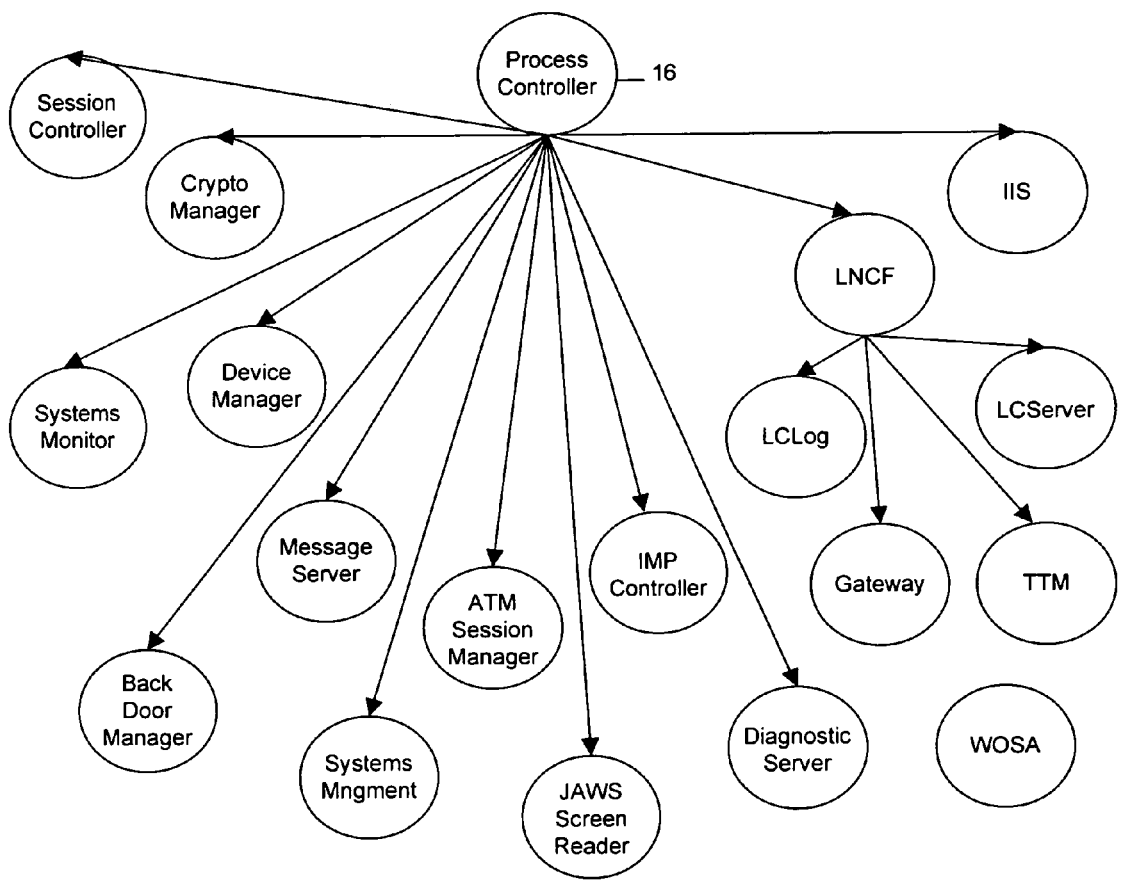
FIG. 4 is a schematic diagram which illustrates an example of the scope and control of processes and service brought up by the process controller for an embodiment of the present invention.

Inter process communications (IPC) for process control 16 utilizes a component object model (COM) interface to all NTDS components. Process control interfaces include, for example [default] IComponentRegistrar, IComponentIdentification, ImanagedComponent, IManagedComponent2, IProcessLifecycle, IEventRegistration, IObjectDirectory. The ATM Session Manager (ASM) is dependent on IIS. The process controller 16 must start IIS before the NTDS processes. The process controller 16 is a COM local server. It is an NT process housing a single COM object running in an single threaded apartment (STA). Accesses to the interfaces are serialized through the STA with the exception of re-entry when there is an outstanding object linking and embedding (OLE) call to other NTDS COM processes. FIG. 4 is a schematic diagram which illustrates an example of the scope and control of processes and service brought up by the process controller 16 for an embodiment of the present invention.

In an embodiment of the present invention, Start Cat and Stop Cat commands put the CAT into particular states. These commands can be initiated from the INC, the operator interface (OI) 24, or the intelligent maintenance panel (IMP) 34. FIG. 5 is a table which shows examples of operator commands that include Start Cat 52 and Stop Cat 54 for an embodiment of the present invention. The possible initiators and semantics of each operation are noted.

In the Global CAT architecture for an embodiment of the present invention, the ATM Session Manager (ASM) 26 is the controlling entity for allocating and determining which type of session to run as well as handling the state of the CAT, managing an out of service screen (OOSS), and notifying the INC of changes in CAT status. For this reason the process controller 16 is designed to process the Stop and Start commands specifically addressing the Global CAT architecture instead of generically propagating the commands. The process controller 16 uses an IATMSessionManager interface supported by the ASM 26 using StopATMSession(stopmode) and StartATMSession(startmode) methods.

In a embodiment of the present invention, the initiators, such as IMP 34, OI 24, and INC are adapted to use an Execute method implemented by the process controller 16 on a IManagedComponent2 interface and pass the appropriate mode. In order to support both the Start Cat 52/Stop Cat 54 and diagnostic operations, an interface is defined to support the loading and unloading of devices. This interface, referred to as IDevicesLifecycle, has a load and unload method. On the "StopATMSession (stopmode)," the ASM 26 puts up the out of service screen, stops the customer session as is appropriate, sends the CAT status to the INC, and notifies the device manager to unload its devices 28. On the "StartATMSession (startmode)," the ASM 26 notifies the device manager to load its devices 26, starts the customer session which puts up the "Hello" screen, and notifies the INC.

FIG. 6 is a table with shows examples of the major functionality of the system monitor for an embodiment of the present invention. Referring to FIG. 6, significant functionality of the system monitor 18 includes, for example, blanking and unblanking a front screen display during system shutdown and startup 56, resetting a hardware watchdog timer periodically 58, resetting the hardware watchdog timeout value for system operation and reboot 60, and sending notification to INC when the system has been reset due to the watchdog timer (WDT) 62. The system monitor 18 is one of the first processes started, since it must start resetting the hardware watchdog timer in order to prevent the timeout from expiring while the system is starting up. The system monitor 18 remains up until a system shutdown (reboot) is issued.

For inter process communications (IPC), the system monitor 18 uses a COM interface to communicate with systems management 30. The ASM 26 uses a COM interface to notify the system monitor 18 when to unblank and blank the video display of the CAT. The system monitor 18 uses IOCTL calls, defined in a video blanking and driver functional specification as the communication with the kernel driver (vbat.sys) that interfaces to the video blanking and timer device. For external communications, Transmission Control Protocol/Internet Protocol (TCP/IP) is used for sending a notification message to the INC, via a systems management status instrument, when the system monitor 18 detects that the system had been reset due to the expiration of the hardware watchdog timer.

The system monitor 18 for an embodiment of the present invention is designed to come up using the NTDS process startup model. The system monitor 18 interfaces with systems management 30 to send a notification to the INC if it detects that the system has been reset due to expiration of the hardware watchdog timeout. The notification cannot be sent to systems management 30 until a StartProcess has been executed. The ASM 26 interfaces with the system monitor 18 to control the video blanking and unblanking via a system monitor interface. When a SHUTDOWN is executed, the video is blanked and the hardware watchdog timeout is set to a configured value, such as 5 minutes.

In an embodiment of the present invention, the system monitor 18 depends on the systems management component 30 being up and operational to send a notification to the INC if it detects that the system has been restarted due to the hardware watchdog timeout expiring. The system monitor 18 cannot send the notification to systems management 30 until a StartProcess has been executed. The system monitor 18 depends on the ASM 26 sending a notification that the video can be unblanked. The system monitor 18 depends on the process controller 16 sending a SHUTDOWN notification in order to blank the video and reset the hardware watchdog timeout value. The system monitor 18 depends on the kernel driver (vbat.sys) that provides the interface to the hardware watchdog timer and video blanking device.

FIG. 7 is a table which shows examples of the major functionality of VIP headphones for an embodiment of the present invention. Referring to FIG. 7, such major functionality includes, for example, the VIP application starting either by detection of headphone insertion or by double tap 64 in top right hand corner, depending on the configuration parameter, software control of audio amplifier output for routing to either speaker or headphone 66 via COM8 port pins to provide more security during the VIP transaction, an audio amplifier board with software control 68 with the ability to detect the physical presence of the amplifier board, and diagnostics required for testing functionality of the amplifier board 70 involving headphone insertion to verify audio routing. A "Switches" COM object handles all software control of the amplifier board .

The VIP application 20 for an embodiment of the present invention accesses the "Switches" COM object. At initialization, the amplifier board is set to manual mode and the speaker is activated for audio output. A "headphone detected" event is generated to the "Hello" screen, and on the "headphone detected" event, the application 20 issues commands through the "Switches" object to route audio to the headphone. For timeout and/or end of session, the application 20 issues a command to route audio to the speaker for the next customer.

Figure 8:
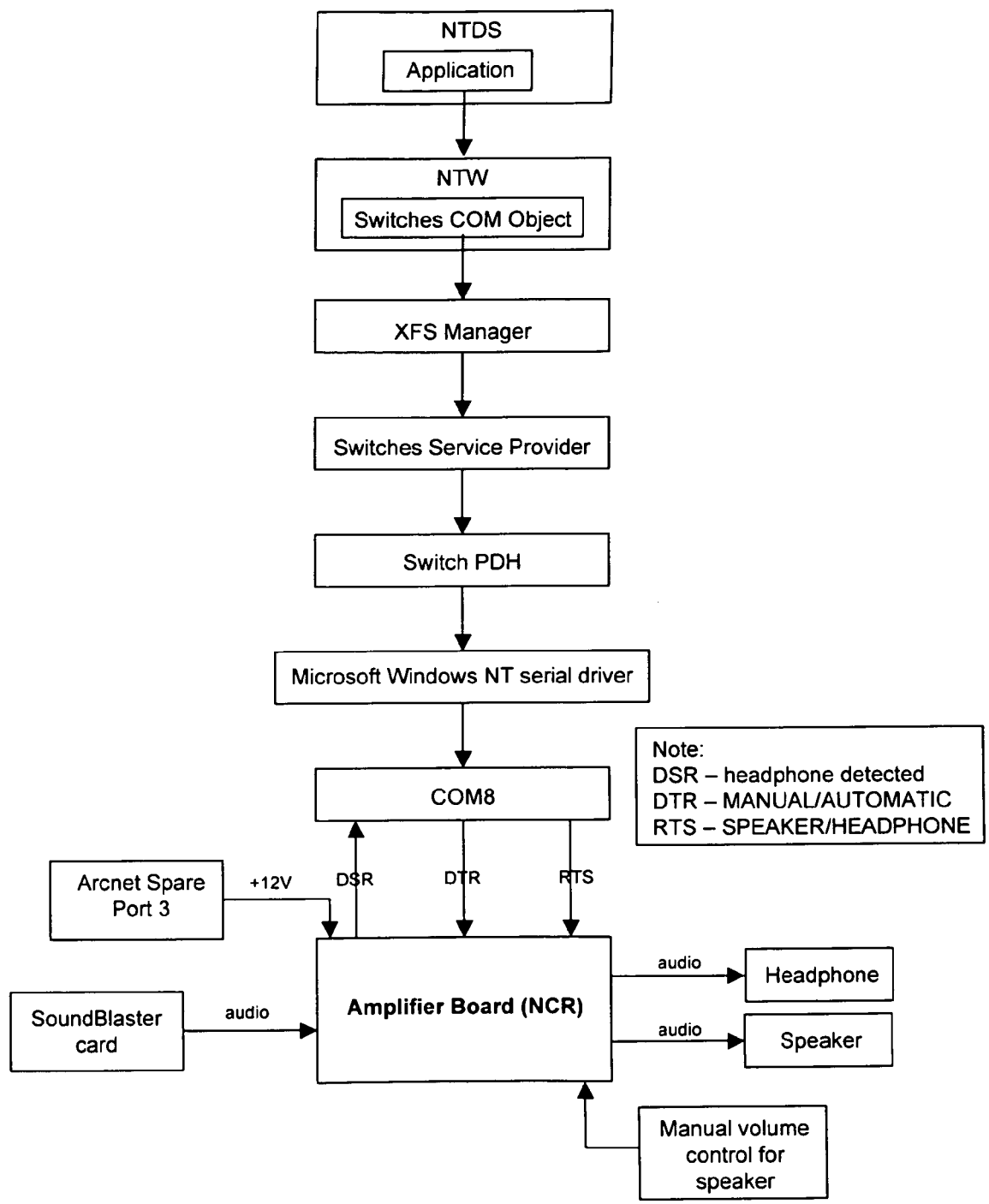
FIG. 8 is a schematic flow chart with illustrates an example outline of the interfaces in a VIP aspect of an embodiment of the present invention.

The VIP Global CAT for an embodiment of the present invention makes use of a new audio amplifier board having software control of the amplifier board. Headphone insertion triggers the VIP application 20 from the "Hello" screen, and double touch triggering of the VIP application 20 is disabled. The VIP application 20 controls audio output, and audio is not routed to the speaker until a VIP session is complete or times out. Diagnostics 32 is available for testing audio routing. FIG. 8 is a schematic flow chart with illustrates an example outline of the interfaces in a VIP aspect of an embodiment of the present invention.

FIG. 9 is a table which shows examples of the major functionality of VIP screen reader 22 for an embodiment of the present invention. Significant functionality of the VIP screen reader 22 includes, for example, allowing visually impaired customers to perform all the transactions that sighted customers are able to do. This is done by providing a text-to-speech capability 72 and a screen layout and navigational method that allows visually impaired customers to sequence through screens and make selections 74 using only the touchscreen without using the keypad.

Figure 10:
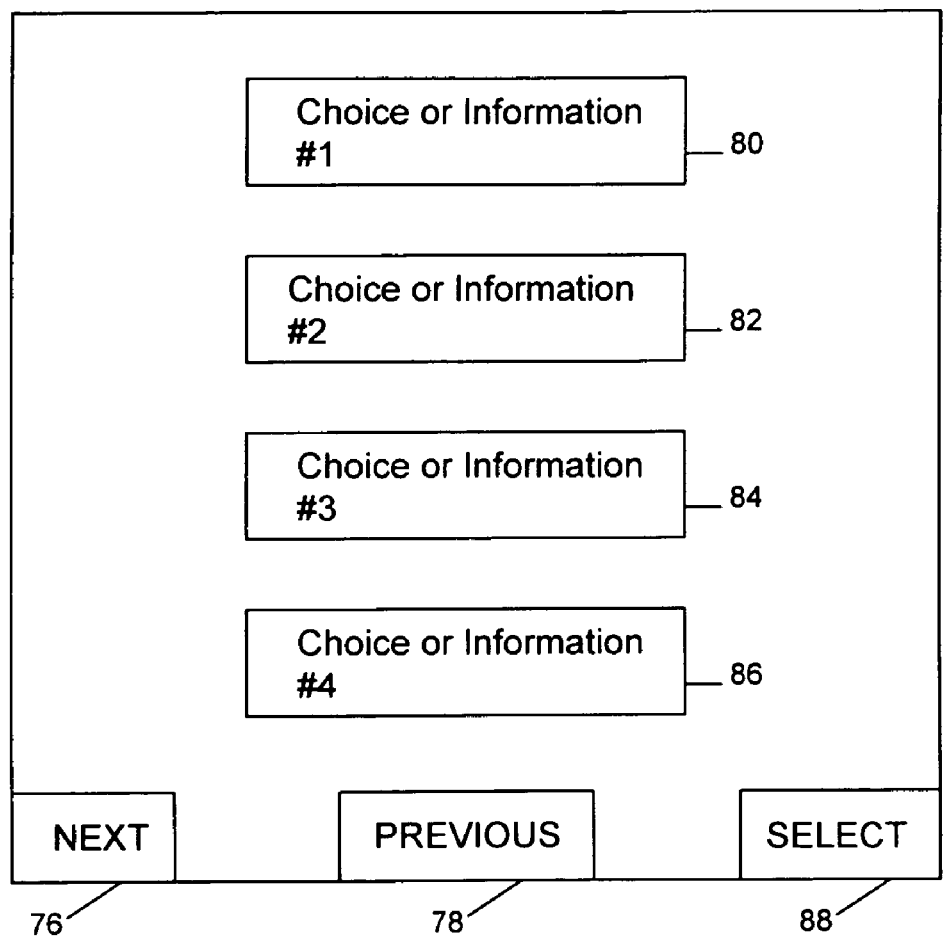
FIG. 10 is a schematic diagram which illustrates an example of a VIP screen layout for an embodiment of the present invention.

FIG. 10 is a schematic diagram which illustrates an example of a VIP screen layout for an embodiment of the present invention. By touching the "NEXT" area 76 or the "PREVIOUS" area 78, customers can sequence through all the choices or information boxes 80, 82, 84, 86 on the screen, one-at-a-time. As each item is reached, it is voiced. When the desired choice is heard, "SELECT" 88 is touched and the action is performed, which is typically a transition to a new screen. By constantly touching "NEXT" 76, all the items can be heard. When the bottom of the screen is reached, it wraps to the top. All items, whether choices or information, are defined as HTML anchors that are sequenced through by "NEXT" 76 or "PREVIOUS" 78 and executed by "SELECT" 88. Touching the items directly will cause a BOOP. Items must be accessed via the navigation zones.

Screen reader software for an embodiment of the present invention includes a number of aspects. A commercially available screen reader product, such as a JAWS executable, is started up by process controller 16 at system initialization. Permanently running but voicing is enabled only for the VIP application 22. Another aspect of the screen reader 22 is an OCX control that is the sole method for invoking voice. An additional aspect of the screen reader 22 are JAWS Internet Explorer scripts including interpretive language that is used to control voicing and that are passed to JAWS by OCX, interpreted and executed by JAWS. A further aspect of the screen reader 22 is a JFWVid.dll kernel display driver that is part of the video driver chain, which is started up by Windows NT at system startup and runs permanently. It is used by JAWS to construct a text map of the entire display area when voicing is enabled. Still another aspect of the screen reader 22 are JAWS utilities which must be run if a new display type is installed on the system.

There are separate screens and a separate navigation shell for the VIP application 22 for an embodiment of the present invention. The underlying application is the same as for sighted customers. The navigation shell, including "NEXT" 76, "PREVIOUS" 78, and "SELECT" 88 communicates voicing commands to JAWS via an OLE custom control (OCX). The OCX methods used include, for example, EnableVoice which enables the voicing capability whenever the VIP application 22 is entered and turns on the screen layout construction by the video driver. Another OCX method includes DisableVoice which disables the voicing capability at initialization and end-of-session and turns off the screen layout construction by the video driver. Other OCX methods include, for example, SayString which voices the passed string argument and ReadCurrentOption which voices the field that currently has the focus in the browser.

Figure 11:
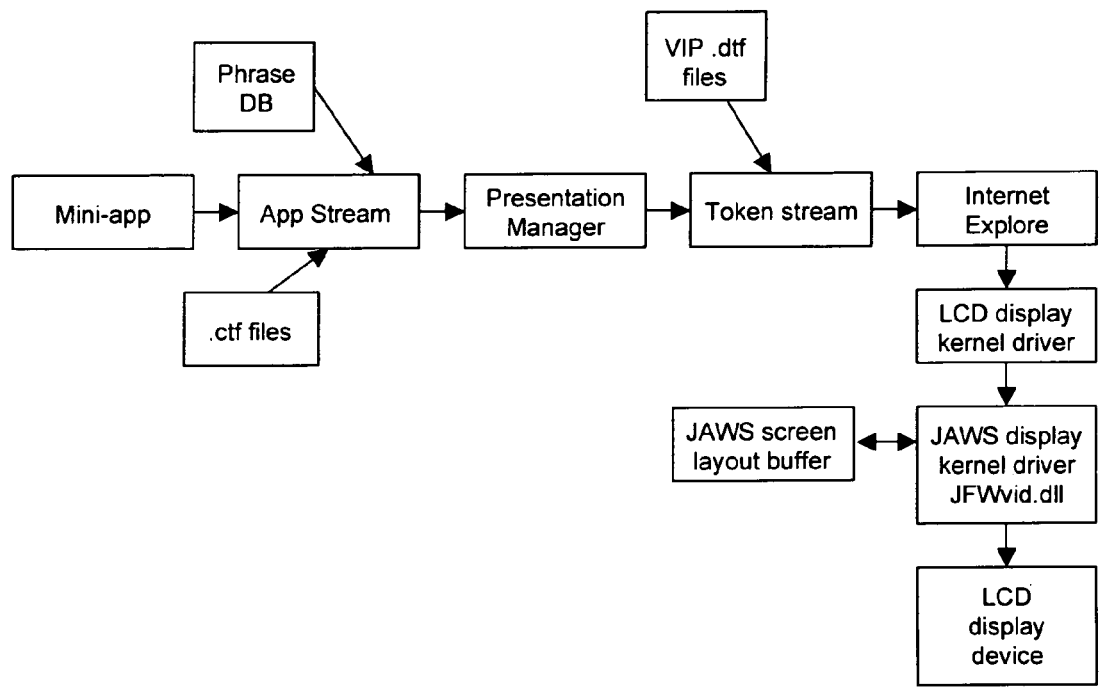
FIG. 11 is a schematic diagram which shows an example overview of VIP Global CAT screen presentation interfaces for an embodiment of the present invention.
Figure 12:
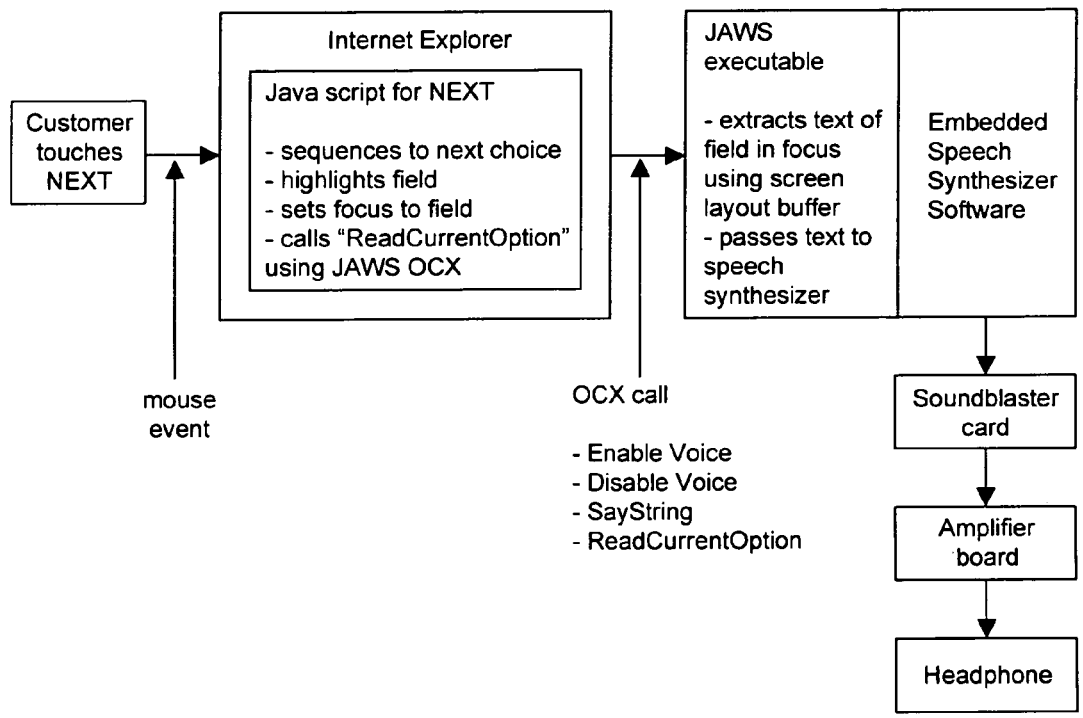
FIG. 12 is a schematic flow chart which illustrates an example of the process of navigating to a VIP screen choice for an embodiment of the present invention.
Figure 13:
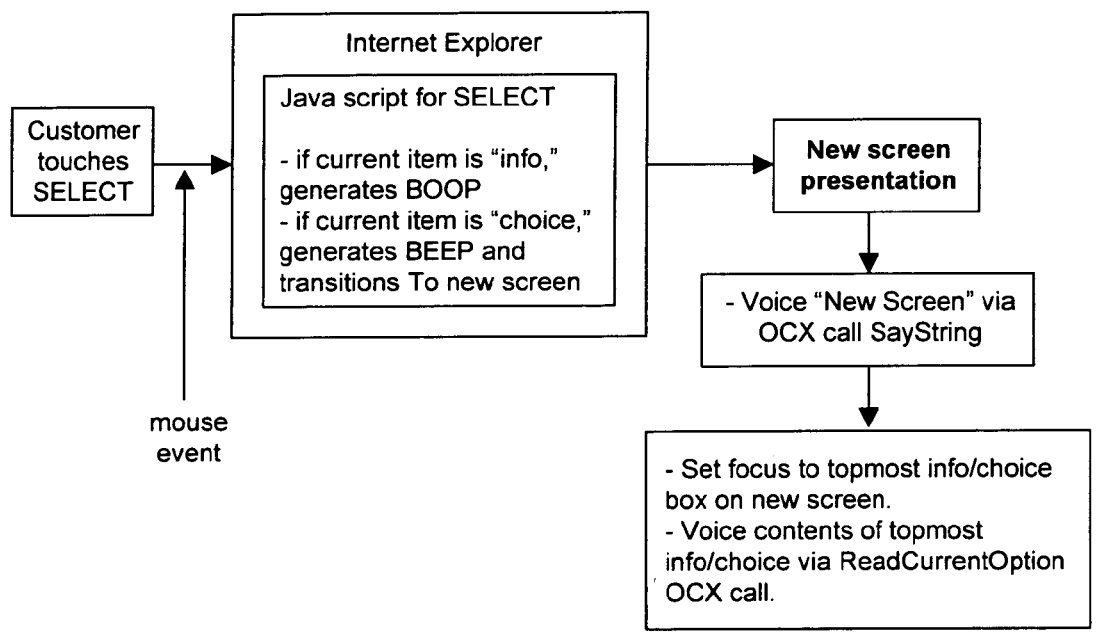
FIG. 13 is a schematic flow chart which illustrates an example of the process of selecting a VIP screen choice for an embodiment of the present invention.

FIG. 11 is a schematic diagram which shows an example overview of VIP Global CAT screen presentation interfaces for an embodiment of the present invention. The VIP screens and normal sighted screens use different "device-specific template" files and phrase definitions but the underlying mini-app and "canonical template" files are the same. The JAWS kernel display driver is inserted into the video driver chain and maintains an image of display memory for use by the JAWS executable when voicing. FIG. 12 is a schematic flow chart which illustrates an example of the process of navigating to a VIP screen choice for an embodiment of the present invention. FIG. 13 is a schematic flow chart which illustrates an example of the process of selecting a VIP screen choice for an embodiment of the present invention. The method for entering a PIN by the visually impaired customer is a special case, such as tap mode, which is necessary for security reasons.

FIG. 14 is a table which shows examples of major operator functionalities of the operator interface (OI) 24 for an embodiment of the present invention. Referring to FIG. 14, significant operator interface functionality includes orderly shut down or reboot system 90, start ATM 92, stop ATM 94, Stop ATM immediate 96, view status of ATM 98, view activity/MIS log 100, view NT event logs 102, view software release information 104, and configure ATM 106. Additional major functionality of the OI 24 includes view ATM configuration 108, view TTM status 110, load keys 112, start back administration 114, start diagnostics 116, start command shell 118, and user account administration 120. The OI navigation shell is an integral part of the OI 24, and is responsible for logging on users, supporting user entitlements, providing high-level menu selections and navigation, with multi-lingual support, and launch OI dialog/applet selected by the user.

Figure 15:
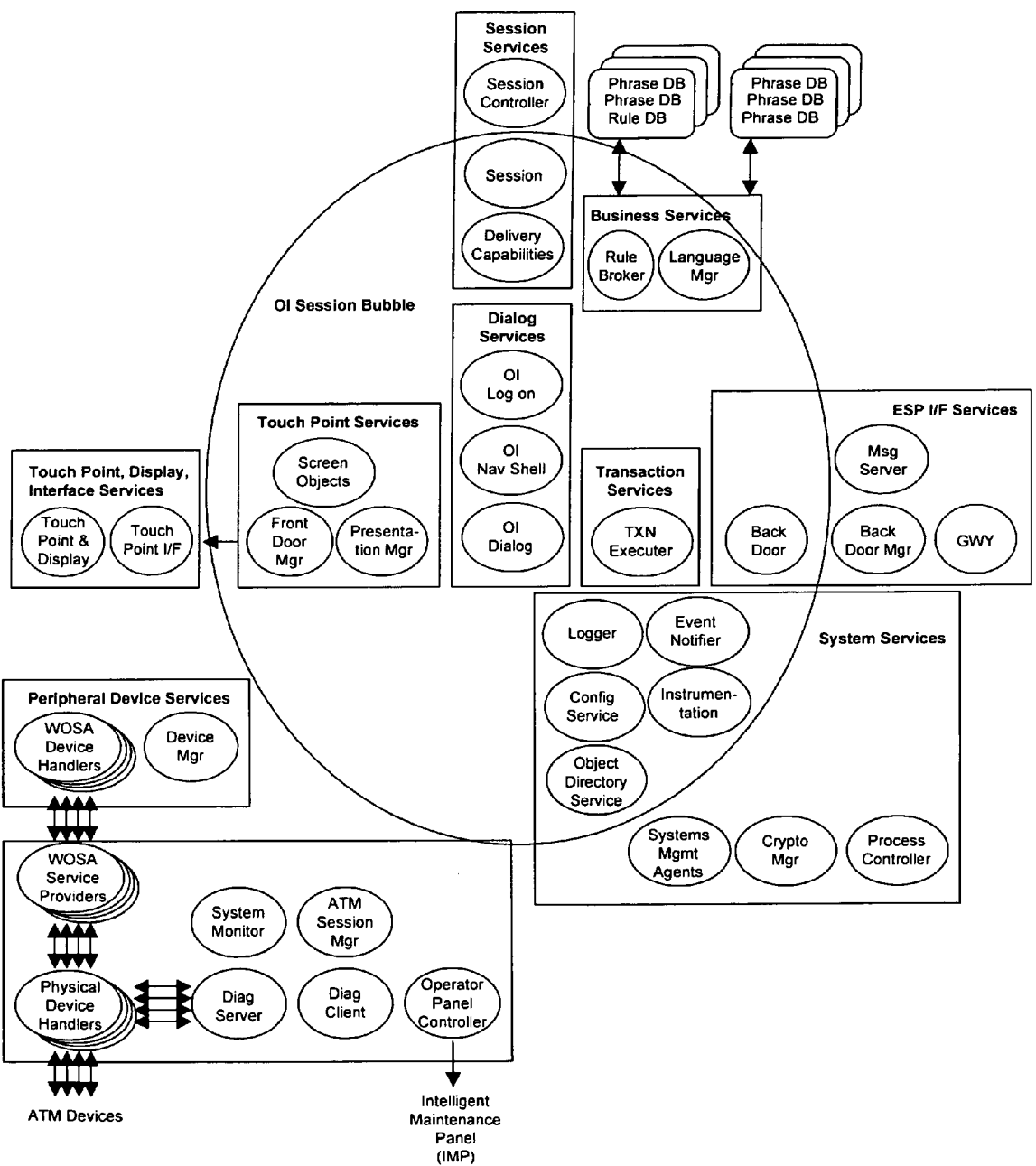
FIG. 15 is a schematic diagram which illustrates an overview example of the ATM components for an embodiment of the present invention while the ATM is in operator session.

FIG. 15 is a schematic diagram which illustrates an overview example of the ATM components for an embodiment of the present invention while the ATM is in operator session. One session bubble is configured for the operator session. The OI session bubble is recreated after each time the user exits OI 24. An OI session is available until the system is shut down. Session components "warm-started" in the OI session bubble include, for example, DeliveryCapability, RuleBroker, PresentationManager, LanguageMan, ApplicationManager, and OI. The OI shell and all OI dialogs/applets support the ISessionComponentLifecycle2 interface.

The OI 24 for an embodiment of the present invention supports some or all of a number of touch points, such as a front screen, client personal computer (PC) on a local network, a video terminal, such as VTIOO, personal digital assistants (PDAs), and a dual monitor. A full set of OI dialogs/applets is implemented once which run on all different touch points. Interfaces implemented by all OI dialogs/applets include, for example, ISessionComponentLifecycle2, IcomponentIdentification, IstreamIn, and IDialog2. Interfaces implemented by OI shell include, for example, ISessionComponentLifecycle2, IComponentIdentification IstreamIn, and ApplicationListener.

The OI shell for an embodiment of the present invention depends on NTDS components, such as ApplicationManager, Collection, ComponentFactory, ComponentRegistrar, Configuration, DeliveryCapability, LanguageMan, Language, Logger, ObjectDirectory, PathRegistry, PresentationManager, ScreenObject, Session, and TemplateStream. OI dialogs/applets depend on some or all NTDS components, including Collection, ComponentFactory, ComponentRegistrar, BackDoor, LanguageMan, Language, Logger, Path- Registry, ScreenObject, and TemplateStream To accomplish certain functions, the OI Shell and OI dialogs often collaborate with other NTDS components.

Security measures for the OI 24 for an embodiment of the present invention include, for example, user log on validated by NT, user account administration dialog providing local administration of user accounts, update of user passwords from INC, inactivity timeout in the OI shell and all OI dialogs, IIS configured to allow restricted remote access from a client PC on a local network, secure communication link between an ATM and a client PC via secure sockets layer (SSL), authenticating a client with a digital certificate, and configuring a client PC to be CISO security compliant.

The ASM 26 for an embodiment of the present invention is a NTDS component that provides various functionality on Global CAT applications. FIG. 16 is a table which shows examples of significant functionality of the ASM 26 for an embodiment of the present invention. Referring to FIG. 16, the major functionality of the ASM 26 includes, for example, bringing up a browser in full-screen mode 122, coordinating starting and re-starting of customer sessions 124, coordinating starting of an operator session at the front screen 126, coordinating entering into and exiting out of hardware diagnostics initiated from the intelligent maintenance panel (IMP) 128, and supporting "Start/Stop/Stop immediate CAT" functions 130.

Other major functionality of the ASM 26 for an embodiment of the present invention consists, for example, of displaying the out-of-service screen under various scenarios 132, which includes system startup and shutdown, a critical device failure, host is down, and the like. Additional functionality of the ASM 26 includes, for example, recovering from out-of-service by monitoring status of host connection, and status of devices and switches which impact the usability of the ATM by customers 134, reporting various ATM status information when the system management agent or operator interface inquires the component 136, reporting when the ATM is out-of-service, and when it is back in service after having been out-of-service 138, and reporting the state of the ATM to indicate whether it is in use or idle, diagnostics is running, or back administration utility is running 140.

The ASM 26 for an embodiment of the present invention is a generic component that can be used on all ATM platforms. However, there are differences across platforms with which the ASM 26 must deal. The ASM 26 is a process component brought up by the process controller 16. It stays around at all times until the system is shut down. The ASM 26 brings up the web browser at initialization. It terminates the browser when the system is shut down. All inter-process and intra-process communication by the ASM 26 are COM based. The ASM 26 can be configured to manage some or all of the critical devices on all ATM platforms, such as card readers, cash dispensers, depositors, pin pads, printers, and switches. It is noted that a 'critical device' is one, which if its status is 'down', causes the ATM to be out-of-service. The ASM 26 supports bring-up of OI sessions and diagnostics on all ATM platforms, in both front-service and rear-service configurations.

Interfaces implemented by the ASM 26 for an embodiment of the present invention include, for example, IcomponentIdentification, IprocessLifecycle, IManagedComponent2, IATMSessionManager, IEventNotification, and IEventRegistration. The ASM 26 uses NTDS components, such as BackDoorManager, ComponentFactory, ComponentRegistrar, DebugLogger, DeviceManager, EventLogger, EventNotifier, Instrument, InstrumentManager, PathRegistry, Session, and SessionController. To accomplish certain functions, the ASM 26 collaborates with other NTDS components. FIG. 17 is a table which summarizes examples of the relationships between the ASM 26 and its collaborators for an embodiment of the present invention.

Figure 18:
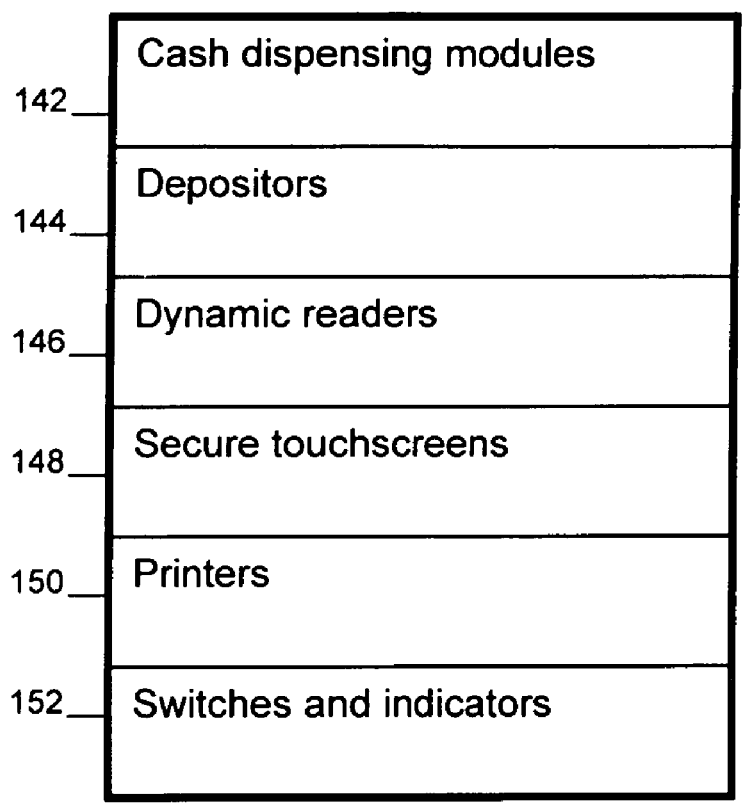
FIG. 18 is a table which shows examples of devices for which device services are provided through service providers for an embodiment of the present invention.

ATM device services 28 for an embodiment of the present invention are provided through WOSA compliant XFS Service Providers for various devices. FIG. 18 is a table which shows examples of devices for which device services 28, are provided through service providers for an embodiment of the present invention. Such devices include, for example, cash dispensing modules 142, depositors 144, dynamic readers 146, secure touchscreens 148, printers 150, and switches and indicators 152. These service providers are packaged as individual DLL's. A service provider is loaded when the device manager issues a WFSOpen for the device associated with that service provider. A service provider is unloaded when the device manager issues a WFSClose for the device 28 associated with that service provider. The service providers listed above are packaged as a DLL and an executable. STS service provider performs encryption key management and PIN encryption.

FIG. 19 is a table which illustrates examples of the major functionality of system management 30 for an embodiment of the present invention. Referring to FIG. 19, significant functionality of system management 30 includes status monitoring 154, inquiry and control commands 156, file transfer and remote command execution 158, software distribution 160, remote peruse 162, log upload 164, auto configuration 166, DNS load balancing support 168, device MIS 170, customer MIS 172, and time synchronization 174.

The INC is configured to support a number of devices on the Global CAT for an embodiment of the present invention. FIG. 20 is a table which illustrates examples of devices on the ATM for which INC is configured to support for an embodiment of the present invention. System management 30 is started by the process controller 16 and remains active until the system is shutdown or rebooted. Inter process communications (IPC) are by COM and TTM, and external communications are by TCP/IP or X.25 to INC. Systems management 30 is platform independent. Platform dependent INC codes are supplied by the platform specific release. System management 30 implements, for example, IStatusMonitor (SMA), EqPADisplay, IprotocolTranslator (MPA), and ICommandDispatch (CDA). SKIP is used for encryption between the INC and the Global CAT, and arbitrary scripts can be downloaded and executed from the INC.

FIG. 21 is a table which shows examples of significant functionality of diagnostics 32 for an embodiment of the present invention. For example, diagnostics 32 executes diagnostics requests on behalf of a diagnostic client, such as the IMP controller using OLE automation 176. In addition, diagnostics 32 communicates directly with the physical device handlers (PDH) for all devices 178, activates PDHs at the beginning of a diagnostics session (Start Diag) 180, uses the PDH message interface to command and/or control devices 182, and deactivates PDHs at the end of diagnostics session (End Diag) 184. Further, diagnostics 32 performs various diagnostics tests on certain peripheral devices 186, and can determine and provide the specific device list to a client 188.

The Diagserver 32 is started by the process controller 16 as a non-OLE component during the Global CAT startup. The order in which it is brought up in relation to the other components is not critical. The only requirement is that the Diagserver 32 should be available when a diagnostic client, such as ElvfP Controller, becomes available to the operator.

The Diagserver 32 is terminated when the process controller 16 performs a shutdown. OLE automation is used between the Diagserver 32 and the Diagnostic client to make diagnostic requests and receive diagnostic test results. When a diagnostics client sends a request to the Diagserver 32 to start a diagnostics session, the physical device handlers (PDH) DLLs are loaded by the Diagserver 32. These DLLs provide a set of command and control APIs to the physical devices.

Figure 22:
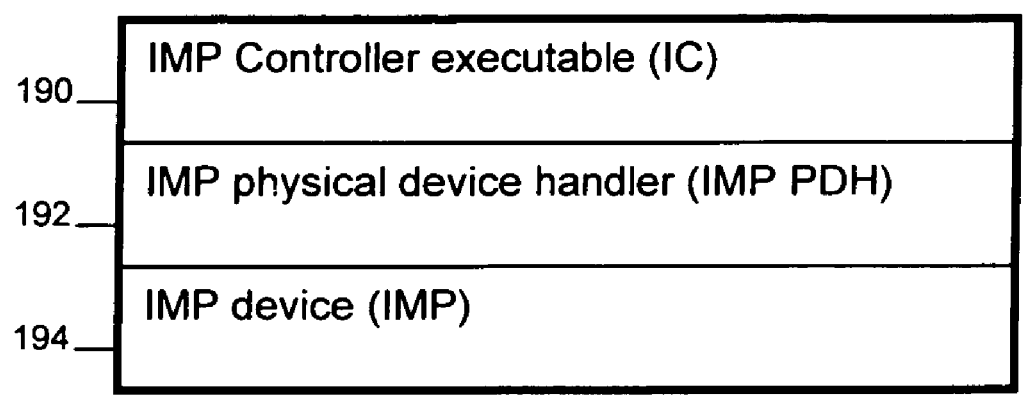
FIG. 22 is a table which shows examples of significant functionality of the intelligent maintenance panel (IMP) for an embodiment of the present invention.

FIG. 22 is a table which shows examples of significant functionality of the intelligent maintenance panel (IMP) 34 for an embodiment of the present invention. Referring to FIG. 22, the major functionality of the IMP 34 is a result of IMP component areas, such as IMP controller executable (IC) 190 as a primary collaborator with NTDS components, IMP physical device handler (IMP PDH) 192 used only by IC and outside the XFS manager, and IMP device (IMP) 194 as internal firmware managing Startup/Shutdown status. Primary areas of functionality of the IC 190 include CAT status, command and/or control, and general. For CAT status, the IC 190 registers for events from the ASM to obtain session status.

Figure 24:
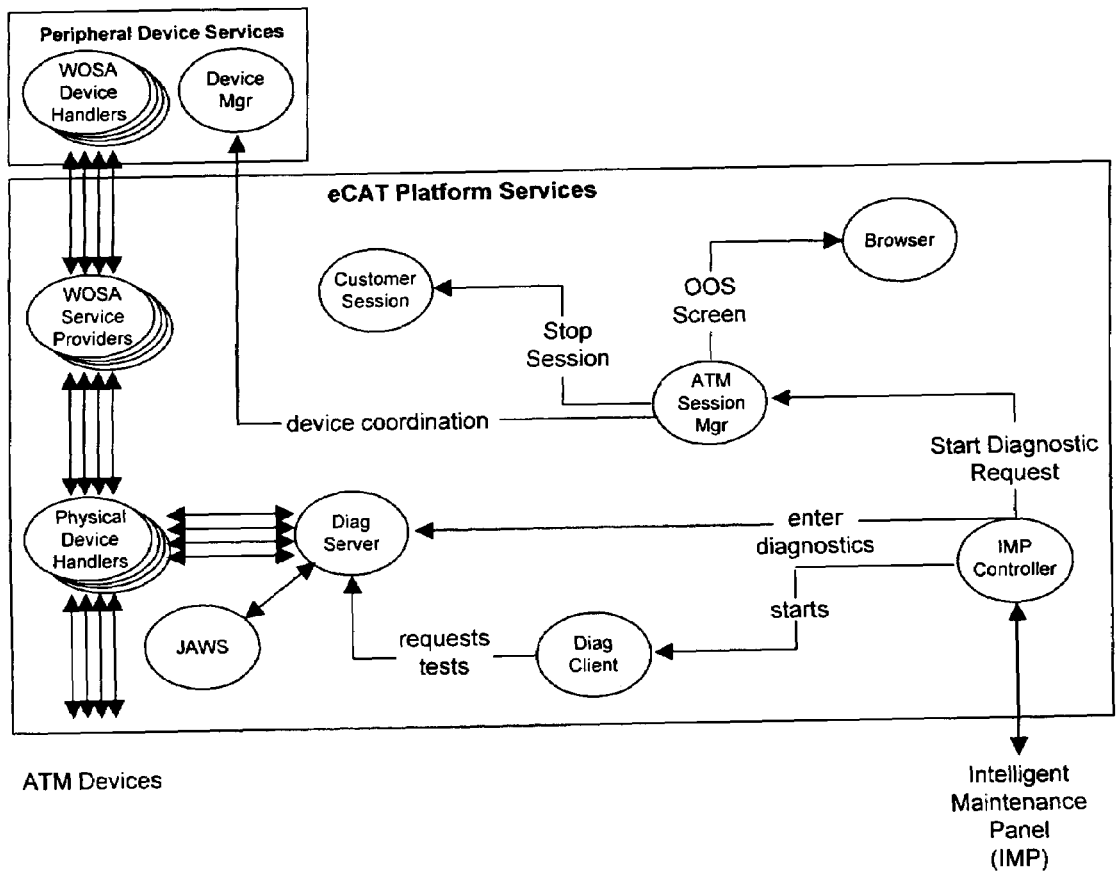
FIG. 24 is a schematic diagram which illustrates examples of the diagnostic components and their interactions with their collaborators for an embodiment of the present invention.

FIG. 23 is a table which shows examples of session states for an embodiment of the present invention. The IC 190 performs a front OI 24 logon via IMP operator selection and allows IMP service mode entry by selecting an "ENTER DIAG" button. For CAT maintenance, the IC 190 performs diagnostics by making requests to the Diagserver 32. In general, the IC 190 communicates directly with the IMP physical device handler (PDH) and performs various diagnostics tests using the Diagserver 32 on certain peripheral devices. The process controller 16 for an embodiment of the present invention, as an NTDS component during Global CAT startup, starts the IC 190. The IC 190 is terminated when the process controller 16 performs a shutdown. FIG. 24 is a schematic diagram which illustrates examples of the diagnostic components and their interactions with their collaborators for an embodiment of the present invention.

Figure 25:
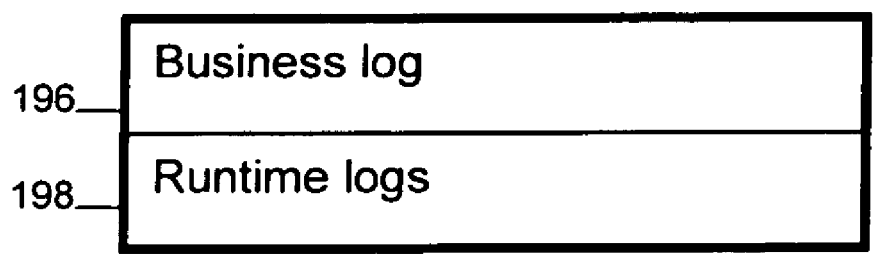
FIG. 25 is a table which illustrates examples of the primary functionality of logging 36 for an embodiment of the present invention.

FIG. 25 is a table which illustrates examples of the primary functionality of logging 36 for an embodiment of the present invention. The major functionality of logging 36 for the Global CAT is divided, for example, into business log 196 and runtime logs 198. The business log 196 records customer transactions for auditing and future investigation purposes. The transaction journal is viewed via the "Peruse" utility. Access to the Peruse utility is granted based on the user account entitlement. The runtime logs 198 include an extended logging mechanism or the XFS service providers to track detail debugging information. The logging manager 36 handles all the tasks required for proper filtering and routing of log messages. All runtime software logs through this manager. All kernel mode drivers and certain utilities use the native NT logging service facilities.

Three interfaces provided to the logging manager 36 for an embodiment of the present invention include LogEvent, LogText and ClntAppLog. The ClntAppLog is maintained for backward compatibility. All new or modified software uses either LogEvent or LogText. Log messages are consolidated and formatted for viewing on a client. The logging manager 36 is a dynamic link library (DLL) and is activated when the system is up. It is deactivated when the system is being shut down. The logging mechanism is generic across Global CAT platforms. It is imperative to protect information contained in the customer transaction journal and runtime log files while those files are being uploaded from the CAT to the INC, and an end-to-end encryption (SKIP) mechanism is used for that purpose.

Figure 26:
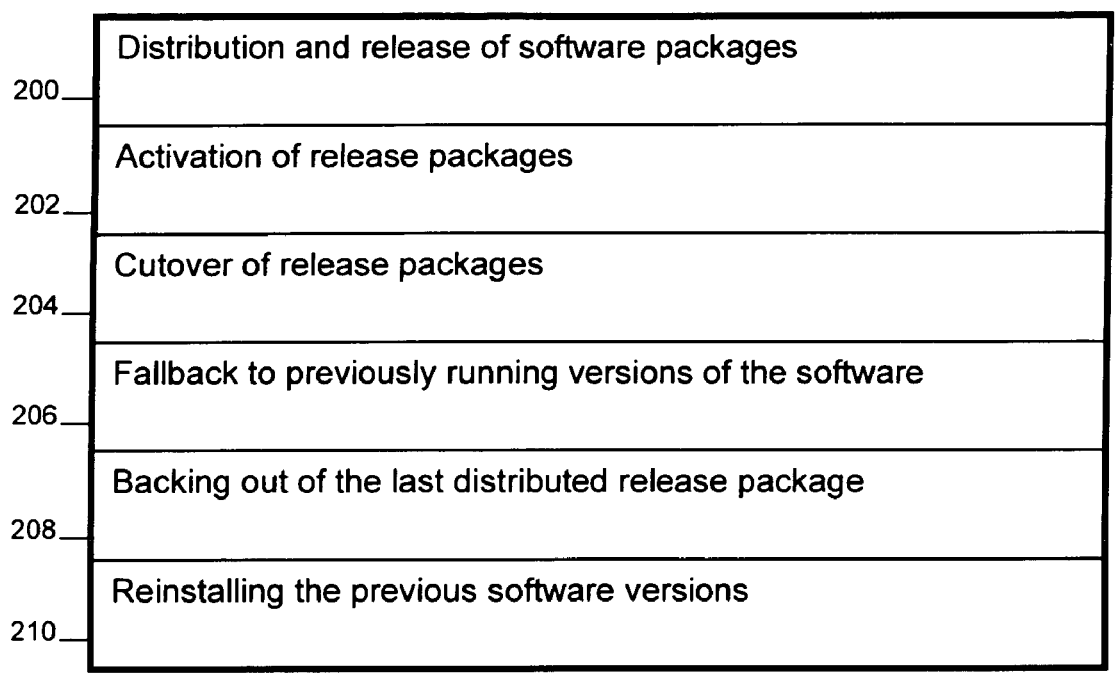
FIG. 26 is a table which shows examples of the major functionality for installation and fallback for an embodiment of the present invention.

FIG. 26 is a table which shows examples of the major functionality for installation and fallback 38 for an embodiment of the present invention. The major functionality of installation and fallback 38 includes, for example, upgrading versions of software currently running on the Global CAT and falling back to previously running versions if the upgrade versions fail and local and remote distribution of software upgrades. Referring to FIG. 26, this functionality involves distribution and release of software packages 200, activation of release packages 202, cutover of release packages 204, fallback to previously running versions of the software 206, backing out of the last distributed release package 208, and reinstalling the previous software versions 210.

Distribution of release packages 200 for an embodiment of the present invention involves distributing one or more sub-system releases in a release package to a hard disk to a fully functional CAT. Activation of release packages 202 involves preparation for release cutovers and invoking generic installation scripts provided by each sub-system in the release package for the fully functional CAT. Cutover to the release package 204 involves reboot of the CAT, invoking upgrade/configuration scripts provided by each subsystem in the release package, and the CAT is fully functional after the software upgrade and configuration of the release package is complete.

Backing out the last distributed release package 208 for an embodiment of the present invention involves deactivating versions of the software in the latest release package so they are longer accessible or re-installable. Reinstalling previous software versions 210 involves carrying out activation and cutover steps for the previously running versions of the affected sub-systems, and the CAT is restored to the same state as just prior to introducing the release package. If an error occurs during cutover to one of the subsystem releases, the INC initiates a fallback to the previously running version of each affected subsystem in the correct fallback order. The framework, both executables and scripts, is invoked as a result of initiating a distribution of a release package, initiating an activation of a release package, initiating a cutover to a release package and reboot after an activation, and initiating a fallback. The framework becomes inactive once its current function completes, and stays inactive until invoked again.

Inter process communications (IPC) communications in the installation and fallback framework 38 for an embodiment of the present invention includes one component, executable or script, invoking a second component and one component creating file content for a second component to read. TCP/IP is used between the INC and the CAT. The installation and fallback framework 38 relies on the NTDS system management and LCserver components to handle all communications with the INC. The software upgrade and fallback framework 38 is generic across Global CAT platforms. Local interface to the software upgrade framework 38 is via CATinstall.ksh. Remote interface to the software upgrade framework 38 is via INC and LCserver.

Figure 27:
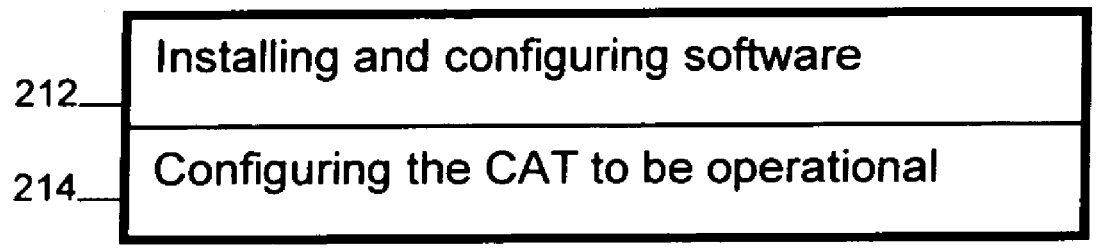
FIG. 27 is a table which illustrates the primary functionality of configuration 40 for an embodiment of the present invention.

FIG. 27 is a table which illustrates the primary functionality of configuration 40 for an embodiment of the present invention. A major functionality of configuration 40 is installing and configuring software 212 which involves, for example, running rif or.reg files to set up required registry entries, copying kernel driver and other files to their required locations, and installing vendor drivers. Another major functionality of configuration is configuring the CAT to be operational 214 which involves, after configuration parameters such as IP and/or X 1 21 address for the CAT, router IP address, host IP or X 1 21 address, time zone, and the like have been entered, propagating these values to the registry locations where NT and vendor software expect them and updating CAT input files, such as nic.in, wipc.ini, hosts, and the like.

Configuration 40 for a embodiment of the present invention makes use of an OI interface for configuring the CAT. This interface has no manual configuration option. The parameters entered are, for example, Nodeid, IP address of the node, IP address of the router, and IP subnet mask. After these parameters are entered, the remaining configuration values come from the INC via oautoconfig (confboc.exe).

The release is up with two sets of INC parameters, the production INC pair and the UAT test pair. The INC parameters that the CAT uses are determined from the login that is used to configure the CAT. If logged in as the 'field' login, the production pair is used. If logged in as the 'UATtest' login, the UATtest pair is used. Once the CAT has been configured, the nodeid parameter cannot be changed on a subsequent configuration of the CAT. Prefix tables and other customization files can be downloaded as part of the auto configuration.

The configuration interface 40 for an embodiment of the present invention also provides, for example, an option for manual or auto configuration from the INC. For manual configuration, the option to select the host communication mode (X.25 or TCP/IP) is provided. The appropriate host parameters (IP or X.25) are prompted for and displayed based upon the host communication mode. The appropriate normalizer (nic.exe for X.25 and nitcp.exe for TCP/IP) is brought up. For manual configuration, the option to select the GATEWAY type (SF, or SFC) is provided, the appropriate GATEWAY configuration is run, and the appropriate GATEWAY executable is brought up.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer implemented method for providing worldwide web content, centralized management, and local and remote administration for a self-service visually impaired person (VIP) Global customer activated transaction (CAT) terminal with an audio amplifier board having software control of the amplifier board, said method, comprising:

receiving a request for a startup of at least one transaction terminal process by a process controller of the transaction terminal selected from a group of transaction terminal processes consisting of a system monitor, a session manager, a device manager, a system manager, a diagnostics application, an intelligent maintenance panel, a log manager, an installation framework, and a configuration framework, in addition to screen reader and audio processes;

starting the at least one requested process by the process controller, in addition to the screen reader and audio processes by the process controller;

providing a screen layout with navigation selections exclusively by touchscreen for the visually impaired user;

performing at least one pre-defined transaction terminal function by the at least one started process, in addition to performing screen reader and audio application functions by the screen reader and audio processes consisting at least in part of reading text that is presented on a screen of the transaction terminal and converting the text to audible speech and diverting the audible speech to a headphone for a visually impaired user, wherein headphone insertion triggers the VIP application from the initial "Hello" screen, and touching the display screen in a predefined manner disables the VIP application;

and wherein the VIP application controls audio output, such that audio output is not routed to the external speakers at the transaction terminal until the completion and timing out of a VIP session, regardless of continued headphone insertion; and if a command to shutdown is received, coordinating an orderly shutdown of the transaction terminal by the process controller.

2. The method of claim 1, wherein receiving the request further comprises receiving the request from one of an integrated network control and an operator interface.

3. The method of claim 2, wherein receiving the request further comprises receiving the request from the integrated network control over a network.

4. The method of claim 3, wherein receiving the request further comprises receiving the request from the integrated network control coupled over the network to a plurality of self-service transaction terminals.

5. The method of claim 2, wherein receiving the request further comprises receiving the request from an operator interface touchpoint consisting of one of a front screen of the transaction terminal, a personal computer on a network, a video screen, and a personal data assistant.

6. The method of claim 1, wherein starting the at least one requested process by the process controller further comprises at least one of monitoring the process by the process controller, restarting the at least one requested process by the process controller, rebooting a transaction terminal system by the process controller, and maintaining a registry of the at least one started process by the process controller.

7. The method of claim 1, wherein the at least one started process comprises the system monitor and wherein performing the at least one pre-defined transaction terminal function further comprises performing a system monitor function selected from a group of system monitor functions consisting of blanking a screen display, unblanking the screen display, resetting a hardware watchdog timer, resetting a hardware watchdog timeout value, and sending a system reset notification to an integrated network control.

8. The method of claim 1, wherein the at least one started process comprises the audio application and wherein performing the at least one pre-defined transaction terminal function further comprises performing an audio application function selected from a group of audio application functions consisting of controlling routing of an audio amplifier output, controlling the audio amplifier board, and diagnostic testing of the amplifier board.

9. The method of claim 1, wherein the at least one started process comprises the session manager and wherein performing the at least one pre-defined transaction terminal function further comprises performing a session manager function selected from a group of session manager functions consisting of bringing up a browser, coordinating one of a customer session, an operator session, and a hardware diagnostics session, supporting one of a transaction terminal start function and a transaction terminal stop function, displaying an out-of-service transaction terminal screen, recovering from an out-of-service condition of the transaction terminal, reporting pre-selected transaction terminal status information, reporting one of an out-of-service and a back-in-service condition of the transaction terminal, and reporting a state of the transaction terminal as one of in use, idle, diagnostics running, and back administration utility running.

10. The method of claim 1, wherein the at least one started process comprises the device manager and wherein performing the at least one pre-defined transaction terminal function further comprises performing a device manager function selected from a group of device manager functions consisting of coordinating and allocating one of a cash dispensing module, a depositor, a dynamic reader, a touchscreen, a printer, a switch, and an indicator.

11. The method of claim 1, wherein the at least one started process comprises the system manager and wherein performing the at least one pre-defined transaction terminal function further comprises performing a system manager function selected from a group of system manager functions consisting of transaction terminal status monitoring, inquiry and control commands, file transfer and remote command execution, software distribution, remote peruse, log upload, auto configuration, load balancing support, device MIS, customer MIS, and time synchronization.

12. The method of claim 1, wherein the at least one started process comprises the diagnostics application and wherein performing the at least one pre-defined transaction terminal function further comprises performing a diagnostics application function selected from a group of diagnostics application functions consisting of executing diagnostics requests, communicating with a physical device handler, diagnostic testing of a peripheral device, and providing a list of devices to a client.

13. The method of claim 1, wherein the at least one started process comprises the intelligent maintenance panel and wherein performing the at least one pre-defined transaction terminal function further comprises performing an intelligent maintenance panel function selected from a group of intelligent maintenance panel functions consisting of obtaining status of one of a session and a device, performing one of a shutdown and a reboot through an operator request, performing an operator interface log on via an operator selection, allowing a service mode entry, and requesting a diagnostic test.

14. The method of claim 1, wherein the at least one started process comprises the log manager and wherein performing the at least one pre-defined transaction terminal function further comprises performing a log manager function selected from a group of log manager functions consisting of maintaining a business log and maintaining a runtime log.

15. The method of claim 1, wherein the at least one started process comprises the installation framework and wherein performing the at least one pre-defined transaction terminal function further comprises performing an installation framework function selected from a group of installation framework functions consisting of distribution of software release packages, activation of software release packages, cutover of software release packages, fallback to a previously running version of software, and backing out of a last distributed software release package and reinstalling a previous software versions.

16. The method of claim 1, wherein the at least one started process comprises the configuration framework and wherein performing the at least one pre-defined transaction terminal function further comprises performing a configuration framework function selected from a group of configuration framework functions consisting of installing and configuring software and configuring the transaction terminal.

17. A system for providing worldwide web content, centralized management, and local and remote administration for a self-service visually impaired person (VIP) Global customer activated transaction (CAT) terminal with an audio amplifier board having software control of the amplifier board, said method, comprising:
  means for receiving a request for a startup of at least one transaction terminal process of the transaction terminal selected from a group of transaction terminal processes consisting of a system monitor, a session manager, a device manager, a system manager, a diagnostics application, an intelligent maintenance panel, a log manager, an installation framework, and a configuration framework, in addition to screen reader and audio processes;
  means for starting the at least one requested process, in addition to the screen reader and audio processes;
  providing a screen layout with navigation selections exclusively by touchscreen for the visually impaired user;
  means for performing at least one pre-defined transaction terminal function by the at least one started process, in addition to performing screen reader and audio application functions by the screen reader and audio processes consisting at least in part of reading text that is presented on a screen of the transaction terminal and converting the text to audible speech and diverting the audible speech to a headphone for a visually impaired user,
  wherein headphone insertion triggers the VIP application from the initial "Hello" screen, and touching the display screen in a predefined manner disables the VIP application;
  and wherein the VIP application controls audio output, such that audio output is not routed to the external speakers at the transaction terminal until the completion and timing out of a VIP session, regardless of continued headphone insertion; and
  if a command to shutdown is received, means for coordinating an orderly shutdown of the transaction terminal.

18. The system of claim 17, wherein the means for receiving the request further comprises a process controller of the transaction terminal.

19. The system of claim 17, wherein the means for receiving the request, starting the requested process, and coordinating an orderly shutdown further comprises a process controller of the transaction terminal coupled to one of an integrated network control and an operator interface.

20. The system of claim 19, wherein the means for receiving the request further comprises the process controller coupled to the integrated network control over a network.

21. The system of claim 19, wherein the means for receiving the request further comprises the process controller coupled to an operator interface touchpoint consisting of one of a front screen of the transaction terminal, a personal computer on a network, a video screen, and a personal data assistant.

22. The system of claim 17, wherein the means for starting the at least one requested process by the process controller further comprises at least one of means for monitoring the at least one started process by the process controller, means for restarting the at least one started process by the process controller, means for rebooting a transaction terminal system by the process controller, and means for maintaining a registry of the at least one started process by the process controller.

23. The system of claim 17, wherein the means for starting the at least one process comprises means for starting the system monitor and wherein the means for performing the at least one pre-defined transaction terminal function further comprises means for performing a system monitor function selected from a group of system monitor functions consisting of blanking a screen display, unblanking the screen display, resetting a hardware watchdog timer, resetting a hardware watchdog timeout value, and sending a system reset notification to an integrated network control.

24. The system of claim 17, wherein the means for starting the at least one process comprises means for starting the audio application and wherein the means for performing the at least one pre-defined transaction terminal function further comprises means for performing an audio application function selected from a group of audio application functions consisting of controlling routing of an audio amplifier output, controlling the audio amplifier board, and diagnostic testing of the amplifier board.

25. The system of claim 17, wherein the means for starting the at least one process comprises means for starting the session manager and wherein the means for performing the at least one pre-defined transaction terminal function further comprises means for performing a session manager function selected from a group of session manager functions consisting of bringing up a browser, coordinating one of a customer session, an operator session, and a hardware diagnostics session, supporting one of a transaction terminal start function and a transaction terminal stop function, displaying an out-of-service transaction terminal screen, recovering from an out-of-service condition of the transaction terminal, reporting pre-selected transaction terminal status information, reporting one of an out-of-service and a back-in-service condition of the transaction terminal, and reporting a state of the transaction terminal as one of in use, idle, diagnostics running, and back administration utility running.

26. The system of claim 17, wherein the means for starting the at least one process comprises means for starting the device manager and wherein the means for performing the at least one pre-defined transaction terminal function further comprises means for performing a device manager function selected from a group of device manager functions consisting of coordinating and allocating one of a cash dispensing module, a depositor, a dynamic reader, a touchscreen, a printer, a switch, and an indicator.

27. The system of claim 17, wherein the means for starting the at least one process comprises means for starting the system manager and wherein the means for performing the at least one pre-defined transaction terminal function further comprises means for performing a system manager function selected from a group of system manager functions consisting of transaction terminal status monitoring, inquiry and control commands, file transfer and remote command execution, software distribution, remote peruse, log upload, auto configuration, load balancing support, device MIS, customer MIS, and time synchronization.

28. The system of claim 17, wherein the means for starting the at least one process comprises means for starting the diagnostics application and wherein the means for performing the at least one pre-defined transaction terminal function further comprises means for performing a diagnostics application function selected from a group of diagnostics application functions consisting of executing diagnostics requests, communicating with a physical device handler, diagnostic testing of a peripheral device, and providing a list of devices to a client.

29. The system of claim 17, wherein the means for starting the at least one process comprises means for starting the intelligent maintenance panel and wherein the means for performing the at least one pre-defined transaction terminal function further comprises means for performing an intelligent maintenance panel function selected from a group of intelligent maintenance panel functions consisting of obtaining status of one of a session and a device, performing one of a shutdown and a reboot through an operator request, performing an operator interface log on via an operator selection, allowing a service mode entry, and requesting a diagnostic test.

30. The system of claim 17, wherein the means for starting the at least one process comprises means for starting the log manager and wherein the means for performing the at least one pre-defined transaction terminal function further comprises means for performing a log manager function selected from a group of log manager functions consisting of maintaining a business log and maintaining a runtime log.

31. The system of claim 17, wherein the means for starting the at least one process comprises means for starting the installation framework and wherein the means for performing the at least one pre-defined transaction terminal function further comprises means for performing an installation framework function selected from a group of installation framework functions consisting of distribution of software release packages, activation of software release packages, cutover of software release packages, fallback to a previously running version of software, and backing out of a last distributed software release package and reinstalling a previous software versions.

32. The system of claim 17, wherein the means for starting the at least one process comprises means for starting the configuration framework and wherein the means for performing the at least one pre-defined transaction terminal function further comprises means for performing a configuration framework function selected from a group of configuration framework functions consisting of installing and configuring software and configuring the transaction terminal.

33. A computer implemented method for providing worldwide web content, centralized management, and local and remote administration for a self-service visually impaired person (VIP) Global customer activated transaction (CAT) terminal with an audio amplifier board having software control of the amplifier board, said method, comprising:

receiving a request for a startup of at least one transaction terminal process by a process controller of the transaction terminal from one of an integrated network control and an operator interface, in addition to screen reader and audio processes;

starting the at least one requested process by the process controller, in addition to the screen reader and audio processes by the process controller;

providing a screen layout with navigation selections exclusively by touchscreen for the visually impaired user;

performing at least one pre-defined transaction terminal function by the started process, in addition to performing screen reader and audio application functions by the screen reader and audio processes consisting at least in part of reading text that is presented on a screen of the transaction terminal and converting the text to audible speech and diverting the audible speech to a headphone for a visually impaired user, wherein headphone insertion triggers the VIP application from the initial "Hello" screen, and touching the display screen in a predefined manner disables the VIP application;

and wherein the VIP application controls audio output, such that audio output is not routed to the external speakers at the transaction terminal until the completion and timing out of a VIP session, regardless of continued headphone insertion; and if a command to shutdown is received, coordinating an orderly shutdown of the transaction terminal by the process controller.

34. The method of claim 33, wherein receiving the request further comprises receiving the request from the integrated network control over a network.

35. The method of claim 34, wherein receiving the request further comprises receiving the request from the integrated network control coupled over the network to a plurality of self-service transaction terminals.

36. The method of claim 33, wherein receiving the request further comprises receiving the request from an operator interface touchpoint consisting of one of a front screen of the transaction terminal, a personal computer on a network, a video screen, and a personal data assistant.

* * * * *